(12) United States Patent
Tago

(10) Patent No.: US 6,598,176 B1
(45) Date of Patent: Jul. 22, 2003

(54) APPARATUS FOR ESTIMATING MICROCONTROLLER AND METHOD THEREOF

(75) Inventor: Osamu Tago, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/472,005

(22) Filed: Dec. 27, 1999

(30) Foreign Application Priority Data

Dec. 28, 1998 (JP) .......................................... 10-374520

(51) Int. Cl.⁷ ................................................ G06F 11/30
(52) U.S. Cl. .......................... 714/28; 714/45; 717/134; 703/28
(58) Field of Search .............................. 714/38, 39, 45, 714/28, 29, 30; 717/124, 128, 129, 134; 712/227; 700/26; 703/28

(56) References Cited

U.S. PATENT DOCUMENTS

| | | | |
|---|---|---|---|
| 5,566,300 A | | 10/1996 | Naoe |
| 5,860,161 A | * | 1/1999 | Hansen ......................... 710/51 |
| 5,903,912 A | * | 5/1999 | Hansen ......................... 711/154 |
| 6,145,122 A | * | 11/2000 | Miller et al. .................... 714/38 |
| 6,269,454 B1 | * | 7/2001 | Mann et al. .................... 714/25 |

FOREIGN PATENT DOCUMENTS

| | | |
|---|---|---|
| EP | 0 391 173 | 10/1990 |
| EP | 0 720 093 | 7/1996 |
| WO | WO 98/45783 | 10/1998 |

* cited by examiner

Primary Examiner—Scott Baderman
(74) Attorney, Agent, or Firm—Staas & Halsey LLP

(57) ABSTRACT

An apparatus for estimating a microcontroller for executing program estimation and system estimation of the microcontroller comprises, in an estimation device, a data holding unit for holding data rewritably; a processing unit for operating the microcontroller on the basis of a control signal and processing the data; an interface unit for external communication, for taking out the control signal from signals supplied from the external and sending it to the processing unit; and an internal bus monitoring unit for monitoring the state of an internal bus connecting mutually the data holding unit, the processing unit and the interface unit for external communication. This apparatus is constituted in such a manner that the data obtained by writing the state of the internal bus, ant the time when the microcontroller is operated, into the internal bus monitoring unit is inputted to the data holding unit, or is sent to the external, via the interface unit for external communication. A method of estimating a microcontroller is executed by using the apparatus having such a construction.

21 Claims, 17 Drawing Sheets

APPARATUS FOR ESTIMATING MICROCONTROLLER AND METHOD THEREOF

BACKGROUND OF THE INVENTION

1. Field of the Invention

The present invention relates to an apparatus for estimating (or testing) a microcontroller that has a function of executing program estimation such as program debugging, and a function of executing system estimation such as system debugging, and also relates to a method of executing program estimation and system estimation.

More particularly, the present invention relates to an apparatus for estimating a microcontroller, including an estimation device that provides a program development environment for debugging a program (software) of a microcontroller, and also provides a user-generated system estimation environment for debugging a system (hardware) generated by a user, and having a system estimation function capable of tracing arbitrarily an operation of an internal bus in the estimation device. The present invention also relates to a method of estimating a microcontroller for executing debugging of a program and debugging of the user-generated system by using the above-mentioned apparatus.

When the user-generated system is estimated, it is necessary at present to return the system back to the environment in which the program was originally developed using an ICE (In-Circuit Emulator) in order to know under which condition the microcontroller exists. On the other hand, the user is likely to use the ICE when developing software for the microcontroller. To assist and satisfy such a need of the user, an ICE-dedicated device is fabricated.

However, the number of man-hours for developing programs of the microcontroller has been reduced and the number of man-hours for estimating the user-generated system after the development of a system estimation device directed to estimate the user-generated system has been reduced, too. In consequence, a demand has arisen for the reduction of the number of man-hours for fabricating a program estimation device, that is, an ICE-dedicated device. As to the user-generated system itself, on the other hand, there has occurred a requirement for estimating the operation of the microcontroller under the same condition as in the case in which a mass-produced chip having the device assembled therein is mounted.

For these reasons, there has occurred the demand for reconsidering ICE-dedicated devices, that have been developed so far, and estimating the user-generated system by the internal functions of the microcontroller.

2. Description of the Related Art

When the program of the microcontroller and the user-generated system are estimated, it has been customary in the past to estimate the program by using an ICE and an ICE-dedicated device, and to estimate the user-generated system by using the system estimation device that is developed separately from the ICE-dedicated device.

Explanation will be given more concretely. Three kinds of chips, that is, EVA (Evaluation), OTP (One Time Programmable) and MASK (Mask), have been developed so far for microcontrollers.

Among these chips, it is the EVA that can be connected to the ICE and can execute program debugging. The ICE-dedicated device described above is assembled into this chip. The OTP is the chip that is practically mounted to a user board and used for estimating the user-generated system. The system estimation device described above is assembled into this chip. After the user-generated system is estimated, the MASK is developed and mass production of the chips is started.

In recent years, however, the OTP incorporating therein the system estimation device has been replaced by a flash microcontroller in which ROM (Read-Only Memory) and RAM (Random Access Memory)comprise a flash memory. Unlike the OTP which can write the program only once, this flash memory can be rewritten $10^2$ to $10^5$ times. The flash microcontroller containing such a flash memory can easily rewrite the system program, that is, the program for the user-generated system. Therefore, the users are more likely to estimate the system program using the flash microcontroller and then to start as such the mass production of the chips without developing the MASK. In the fields of an HDD (Hard Disk Drive) and portable electronic appliances, for example, the number of users who carry out the mass production of chips by using only the flash microcontroller has increased because an upgrade of a version of the system program is frequently made in such fields.

One of the reasons why such a tendency has occurred is because the price of the flash microcontroller, that was once four to five times the price of the MASK, has dropped down to 1.2 to 1.5 times. This tendency has been accelerated at present in the field in which the tendency of the mass production of the chips of the flash microcontroller type has become wide spread. Therefore, it has become necessary at present to separately develop the EVA, which incorporates the ICE-dedicated device, and the flash microcontroller (inclusive of the ODP) which incorporates the system estimation device.

The program development cycles of users have become faster and the program has become fixed within a shorter time in recent years with the result that the estimation schedule of the user-generated system tends to become shorter. Because the number of man-hours for the system estimation device must thus be decreased, it has become more difficult to set the number of man-hours of development of the system estimation device independently of the number of man-hours of the ICE-dedicated device. Furthermore, because the user-generated system has become more complicated, the limit to the estimation of the user-generated system using the system estimation device has become more apparent. It has thus become indispensable to develop a device that can satisfy fully the condition of the program estimation and the condition of the user-generated system estimation.

Namely, even when the microcontroller is estimated by the methods described above, the sum of (number of man-hours of program development+number of man-hours of development of device designed exclusively for ICE) does not match with the sum of "number of man-hours of development of ICE-dedicated device" and "number of man-hours of development of system estimation device". Thus, means for providing an environment for estimating quickly and efficiently the user-generated system has become necessary. It has become also necessary to provide an estimation environment of the user-generated system that can cope with complication of the user-generated system.

In order to clarify the problems of the estimation system of the microcontroller according to the prior art, that has been devised to eliminate the disadvantages described above, the construction of the estimation device used conventionally for estimating the microcontroller, and the estimation system of the microcontroller using this estimation device, will be explained with reference to FIGS. 1 and 2 of the later-appearing "BRIEF DESCRIPTION OF THE DRAWINGS"

FIG. 1 shows the construction of the estimation device used conventionally for estimating the microcontroller. As shown in FIG. 1, this estimation device (that is, the ICE-dedicated device) 100 incorporates therein a tool interface (that is, ICE interface 104) having an interface function with an ICE 90 (see FIG. 2), a CPU (Central Processing Unit) for debugging a program, a peripheral circuit. 107 for processing the control signal sent from the tool interface, a built-in RAM 103 for temporarily storing the program sent from the ICE 90, and a bus monitoring unit 107 for monitoring the state of an internal bus 160.

After the ICE-dedicated device 100 is connected to the ICE 900 through the tool interface 104, it is connected to the system estimation board, etc., through the probe cable (for example, the later-appearing target probe 102 in FIG. 2). In this way, program debugging and estimation of the user-generated system are executed.

Explanation is given hereby in further detail. In the prior art apparatuses, the ICE-dedicated tool interface 104 is built in the device, and the program outputted from the memory connected to the ICE 90 is loaded from the program loader 109 to the bus control unit 108. He bus monitoring unit 105 monitors the state of the internal bus 160, and emulation is executed by the ICE through the tool interface 104.

The ICE-dedicated device 100 does not have the built-in rewritable program ROM. Therefore, the function unit A containing the tool interface 104 and the bus control unit 108 is regarded virtually as the program memory and the program portion that is desired to be rewritten is loaded to the program memory from the ICE 90 through the tool interface 104. Monitoring of the internal bus 160 is effected at this time so that the program can be estimated.

A block diagram showing the estimation system of the conventional microcontroller using the ICE-dedicated device 100 shown in FIG. 1, is illustrated in FIG. 2. However, the construction of the conventional estimation system of the microcontroller is shown in a simplified form for simplifying the explanation.

FIG. 2 shows concretely the mounting position of the ICE-dedicated device 100 and its role when this device 100 is used for system estimation. Here, the program that is programmed by a personal computer 98 is loaded to the ICE-dedicated device 100 from the ICE 90 through the tool interface 104. The ICE-dedicated device 100 is mounted to a system estimation device mounting portion 110 of the system estimation board 92-2. An operation signal is supplied to the system estimation board 92-2. Whether or not the system estimation board operates normally at this time can be easily determined by monitoring the state of the internal bus 160 of the ICE-dedicated device 100. Therefore, the information on the state of the internal bus 160 is converted to the form that can be grasped by the personal computer 98, and debugging of the program is executed by this personal computer 98.

An explanation will be given in further detail. In the conventional estimation system of the microcontroller shown in FIG. 2, the ICE-dedicated device 100 for constituting the microcontroller contains, as built-in devices, the tool interface 104 having the interface function with the ICE 90 and the target probe 102 for converting the form of the signals supplied from the ICE 90. The signals supplied from the ICE 90 contain the control signal Sic for controlling the CPU 106 inside the ICE-dedicated device, 100 and the address/data signals Sia relating to the program offered by the ICE 90. These control signal Sic and address/data signals Sia are processed by the tool interface 104 and are then transferred to the CPU 106 and to the target probe 102.

The tool interface 104 is generally equipped with a peripheral function for processing the signals of the serial form and the signals of the parallel form, and can process the signals of an arbitrary form supplied from the ICE 90 by this peripheral function. On the other hand, the target probe 102 is typically equipped with a number of jumper lines for signal transfer. After the form of the address/data signals Sia from the ICE 90 is converted by the target probe 102, these signals are sent to the system estimation device mounting portion 110 of the system estimation board (which is also called the "target board") 92-2 through the jumper lines.

In the construction shown in FIG. 2, the CPU 106 inside the ICE-dedicated device 100 is allowed to execute debugging of the program by operating the program of the ICE 90 while the ICE-dedicated device 160 is mounted to the program estimation board 92-1. At the same time, the program of the ICE 90 is sent to the system estimation device mounting portion 110 through the target probe 102 so as to create the same state as the state where the system estimation device is practically mounted to the system estimation board 92-2. In this way, the user-generated system can be estimated by using only the ICE-dedicated device.

As described above, in the conventional estimation system of the microcontroller shown in FIGS. 1 and 2, the target probe is provided to the ICE-dedicated device, that has been directed mainly for debugging of the program, in order to cope with the program development and user-generated system estimation within a shorter time, and user-generated system estimation is executed in a simple way by using the ICE-dedicated device furnished with the target probe.

According to such a construction, however, the signal for program estimation from the ICE is supplied to the system estimation board through the target probe. Therefore, the possibility that user-generated system estimation cannot be executed correctly occurs because an AC (Advanced Communication) standard imparted to the signals, to be transferred is likely to vary. Therefore, the problem remains unsolved in that user-generated system estimation becomes again necessary by mounting the system estimation device to the system estimation board.

On the other hand, the user-generated system has become so complicated that program defects (e.g., branch conditions) cannot be grasped even when the system estimation device is employed. In consequence, it takes a lot of labor and time to discover the bugs in the software from the outside of the system estimation device, and user-generated system estimation using the system estimation device is likely to impede the efficient development of the user-generated system.

SUMMARY OF THE INVENTION

In view of the problems described above, it is an object of the present invention to provide an apparatus for estimating a microcontroller that can develop a program estimation device and a system estimation device within a short time and can execute easily and efficiently user-generated system estimation, and an estimation method thereof.

To accomplish this object, an apparatus for estimating a microcontroller according to the present invention comprises, in one device, a data holding unit for holding arbitrary data rewritably; a processing unit for processing the arbitrary data by operating a microcontroller on the basis of a control signal; an interface unit for external communication, for receiving signals supplied from the external (e.g., an external device), taking out the control signal and sending it to the processing unit; and an internal bus monitoring unit for monitoring the state of an internal bus for mutually connecting the data holding unit, the processing unit and the interface unit for external communication.

Here, the processing unit has a construction such that it writes the state of the internal bus, at the time when the microcontroller is operated on the basis of the control signal, into the internal bus monitoring unit, and inputs the data written into this internal bus monitoring unit to the data holding unit or sends the data to the external.

Preferably, in the apparatus for estimating the microcontroller according to the present invention, the interface unit for external communication has a serial/parallel interface circuit containing a serial interface for processing signals of a serial form and a parallel interface for processing signals of a parallel form.

The terminals of each of the serial interface and the parallel interface in the serial/parallel interface circuit can function also as the terminals for handling the signals used for general-purpose ports. When the terminals of each of the serial interface and the parallel interface in the parallel/serial interface circuit function also as the terminals for handling the input/output signals other than the signals used for the general-purpose ports, these terminals can be switched to the terminals for handling the input/output signals other than the signals used for the general-purpose port during the period in which the serial interface and the parallel interface are used.

On the other hand, an apparatus for estimating a microcontroller according to the present invention comprises, in a first device, a first data holding unit for holding arbitrary data rewritably; a first processing unit for processing the arbitrary data by operating a microcontroller on the basis of a first control signal; a first interface unit for external communication, for receiving signals supplied from the external, taking out the first control signal, and sending it to the first processing unit; and a first internal bus monitoring unit for monitoring the state of a first internal bus for mutually connecting the first data holding unit, the first processing unit and the first interface unit for external communication. Furthermore, the estimation apparatus comprises, in a second device, a second data holding unit for holding arbitrary data rewritably; a second processing unit for processing the arbitrary data by operating the microcontroller on the basis of a second control signal; a second interface unit for external communication, for receiving the signals from the first interface unit for external communication, taking out the second control signal and sending it to the second processing unit; and a second internal bus monitoring unit for monitoring the state of a second internal bus for mutually connecting the second data holding unit, the second processing unit and the second interface unit for external communication.

Program estimation of the microcontroller is executed in the following way in the estimation apparatus of the microcontroller having the construction described above. The first device and the second device are connected through the first and second interface units for external communication. The first processing unit in the first device transfers the signals supplied from outside to the second interface unit for external communication through the first interface unit for external communication. The second processing unit in the second device writes the state of the second internal bus at the time when the program for program estimation, that is contained in the signals transferred to the second interface unit for external communication, is operated, into the second internal bus monitoring unit, and inputs the data written into the second internal bus monitoring unit, to the first internal bus monitoring unit or the first data holding unit through the second and first interface units for external communication, or sends it to the external. When system estimation of the microcontroller is executed, the first device is cut off from the second device, and the second processing unit in the second device writes the state of the second internal bus, at the time when the program for system estimation, that is contained in the signals written into the second data holding unit, is operated, is written into the second internal bus monitoring unit through the second interface unit for external communication, and reads out the data written into the second internal bus monitoring unit from the second interface unit for external communication.

Incidentally, when the first and second devices are fabricated by the same fabrication process, these devices can be accomplished by the same chip.

In the estimation apparatus of the microcontroller according to the present invention, the first interface unit for external communication includes a first serial interface for processing the signals of the serial form and a first parallel interface for processing the signals of the parallel form, and the second interface unit for external communication includes a second serial interface for processing the signals of the serial form and a second parallel interface for processing the signals of the parallel form. When program estimation of the microcontroller is executed in the estimation apparatus of the microcontroller having such a construction, the first and second devices are connected through the first and second serial interfaces, and the signals supplied from the external are inputted to the first parallel interface and are then transferred to the second serial interface through the first serial interface.

The first data holding unit preferably comprises a first ROM which is capable of electrically rewriting the data and the second data holding unit preferably comprises a second ROM which is capable of electrically rewriting the data.

Preferably, the estimation apparatus includes, in the first device, a first on-board write interface having a function of rewriting the content of the data in the first ROM while the first device is mounted to a first board, and includes, in the second device, a second on-board write interface having a function of rewriting the content of the data inside the second ROM while the second device is mounted to a second board.

On the other hand, when a data holding unit for holding rewritably arbitrary data, a processing unit for processing the arbitrary data by operating a microcontroller, an interface unit for external communication, for receiving signals supplied from the external and processing them and an internal bus monitoring unit for monitoring the state of an internal bus are assembled in one device, a method of estimating a microcontroller according to the present invention comprises the steps of writing the state of the internal bus, at the time when the microcontroller is operated on the basis of the control signal taken out from the signals supplied from the external, into the internal bus monitoring unit, and inputting the data written into the internal bus monitoring unit to the data holding unit, or sends it to the external.

On the other hand, when a first data holding unit for holding arbitrary data rewritably, a first processing unit for processing the arbitrary data by operating a microcontroller, a first interface unit for external communication, for receiving signals supplied from the external and a first internal bus monitoring unit for monitoring the state of a first internal bus are assembled in a first device and when a second data holding unit for holding arbitrary data rewritably, a second processing unit for processing the arbitrary data by operating the microcontroller, a second interface unit for receiving and processing the signals supplied from the external and a second internal bus monitoring unit for monitoring the state of a second internal bus are assembled in a second device, a method of estimating a microcontroller according to the present invention, when it executes program estimation of the microcontroller, comprises the steps of transferring the signals supplied from the external to the second interface unit for external communication through the first interface unit for external communication in the first device, writing, in the second device, the state of the second internal bus at the time when a program for program estimation, that is contained in the signals transferred to the second interface unit for external communication, into the second internal bus monitoring unit, and inputting the data written into the second internal bus monitoring unit to the first internal bus monitoring unit or the first data holding unit in the first device through the second and first interface units for external communication, or sending the data to the external, and comprises, when system estimation of the microcontroller is executed, the steps of cutting off the first device from the second device, writing, in the second device, the state of the second internal bus at the time when a program for system estimation, that is contained in the signals written into the second data holding unit, into the second internal bus monitoring unit through the second interface unit for external communication, and reading out the data written into the second internal bus monitoring unit from the second interface unit for external communication.

The estimation apparatus of the microcontroller and the estimation method thereof according to the present invention can easily execute program estimation and system estimation while the program estimation device and the system estimation device are mounted to the board of the user-generated system. Therefore, the program estimation device and the system estimation device need not be developed separately, but can be developed within a short time. In this case, both the program estimation device and the system estimation device can be accomplished by developing only one kind of the device. Therefore, the users can make timely system design, and the TAT (Turnaround time also called the "number of man-hours for system development") can be reduced remarkably. In other words, the present invention can sufficiently satisfy the user's requirement for the reduction of the system design time as well as the device development. When program estimation and system estimation are executed using one kind of the devices described above, the installation cost can be reduced because the probe cable is not used.

The estimation apparatus of the microcontroller and the estimation method thereof according to the present invention can efficiently execute program estimation and user-generated system estimation in the same environment as when the mass-produced devices are mounted to the board of the system. Therefore, the shift from the program development and the system development to the mass production of the devices can be made smoothly.

More concretely, the estimation apparatus of the microcontroller and the estimation method thereof according to the present invention use one chip in place of the EVA and the flash microcontroller (inclusive of the OTP), and make it possible to improve the TAT for the development and to start immediately the mass production by using one-chip microcontroller constituted by this one chip. In a practical construction, connection with the ICE becomes possible by using two one-chip microcontrollers, and the microcontroller can be used as the flash microcontroller whose mass production can be conducted readily by using one one-chip microcontroller. In consequence, the present invention can accomplish the functions of two or three kinds of chips according to the prior art by developing one kind of chips.

BRIEF DESCRIPTION OF THE DRAWINGS

The above object and features of the present invention will become more apparent from the following description of the preferred embodiments with reference to the accompanying drawings, wherein.

DESCRIPTION OF THE PREFERRED EMBODIMENTS

Figure 1:
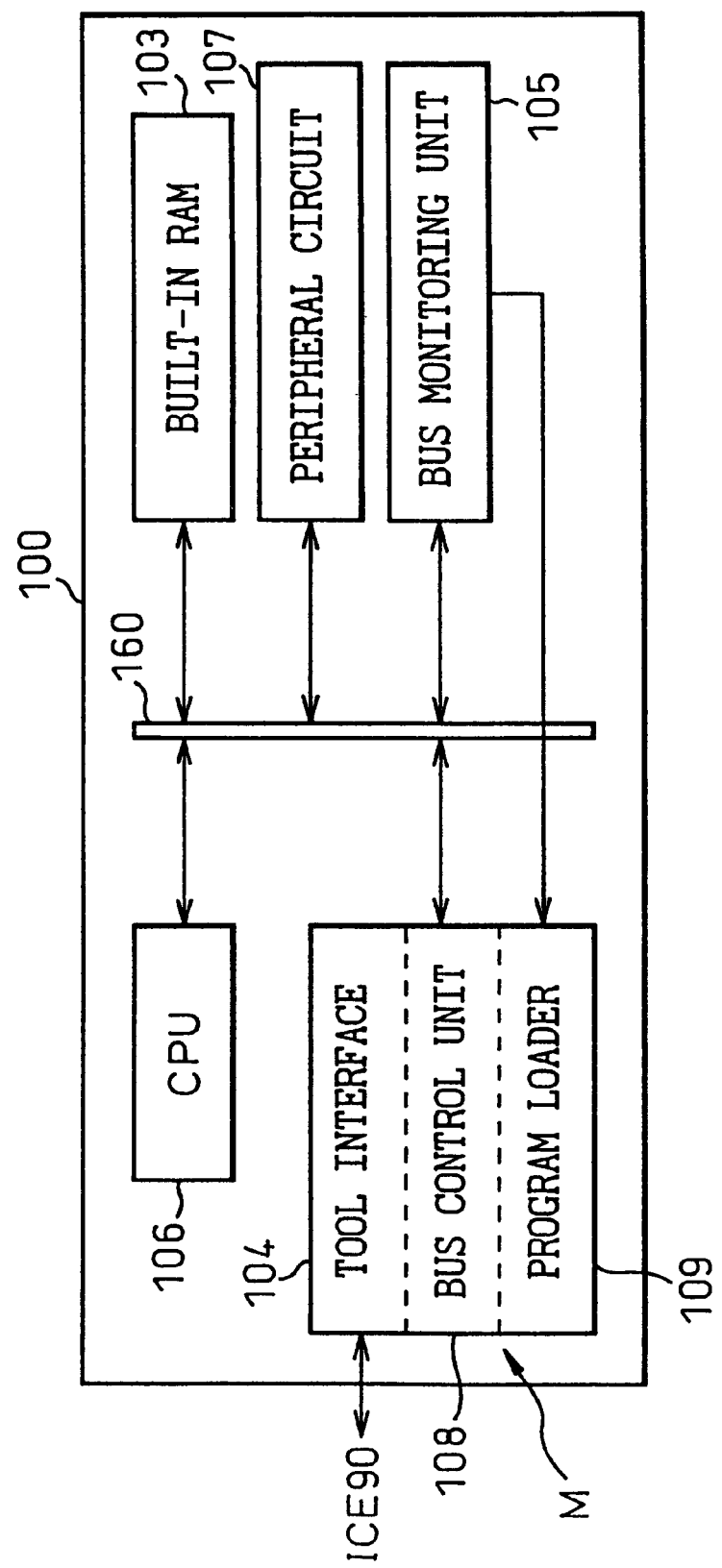
FIG. 1 is a block diagram showing the construction of an estimation device used for estimating a microcontroller according to the prior art.
Figure 2:
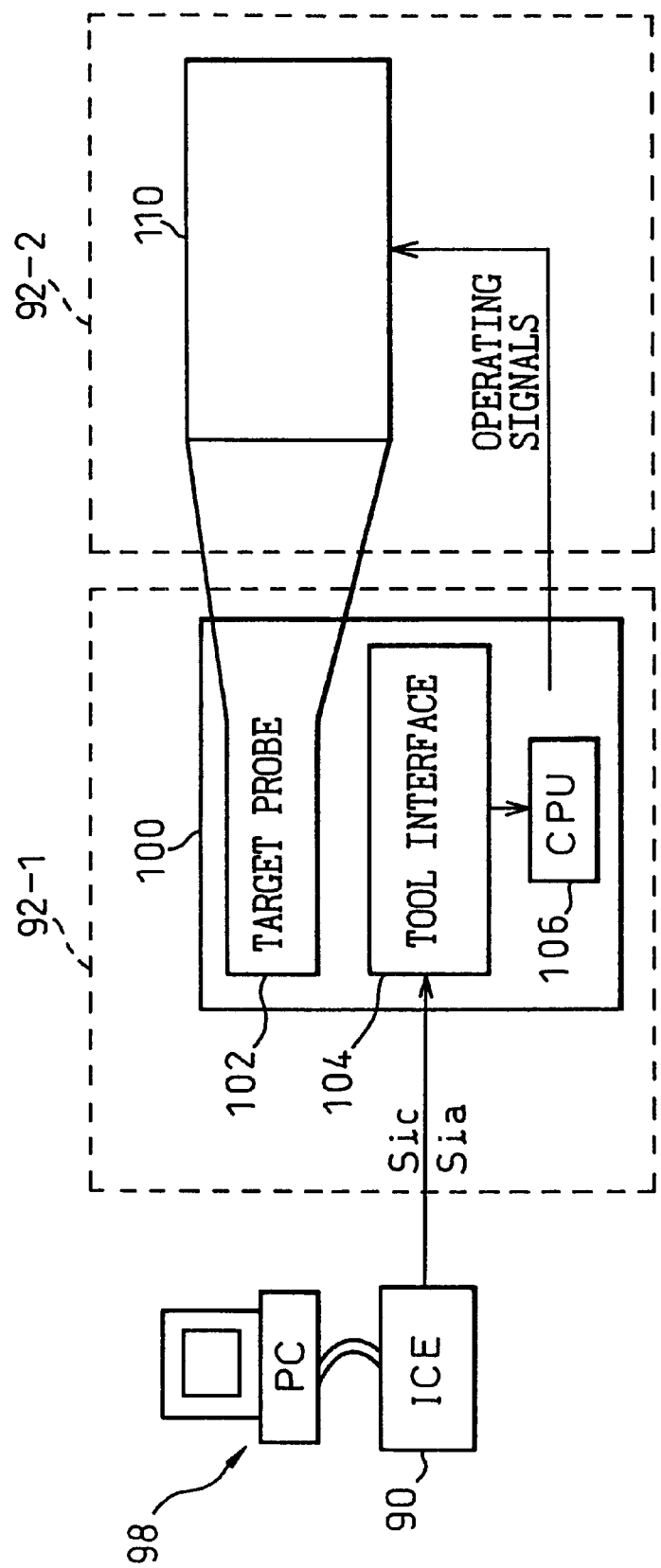
FIG. 2 is a block diagram showing an estimation system of a microcontroller according to the prior art.

Hereinafter, the basic embodiment as well as the preferred embodiments of the present invention will be explained with reference to the accompanying drawing (FIGS. 3 to 18). Incidentally, like reference numerals will be used hereinafter to identify like constituent elements.

Figure 3:
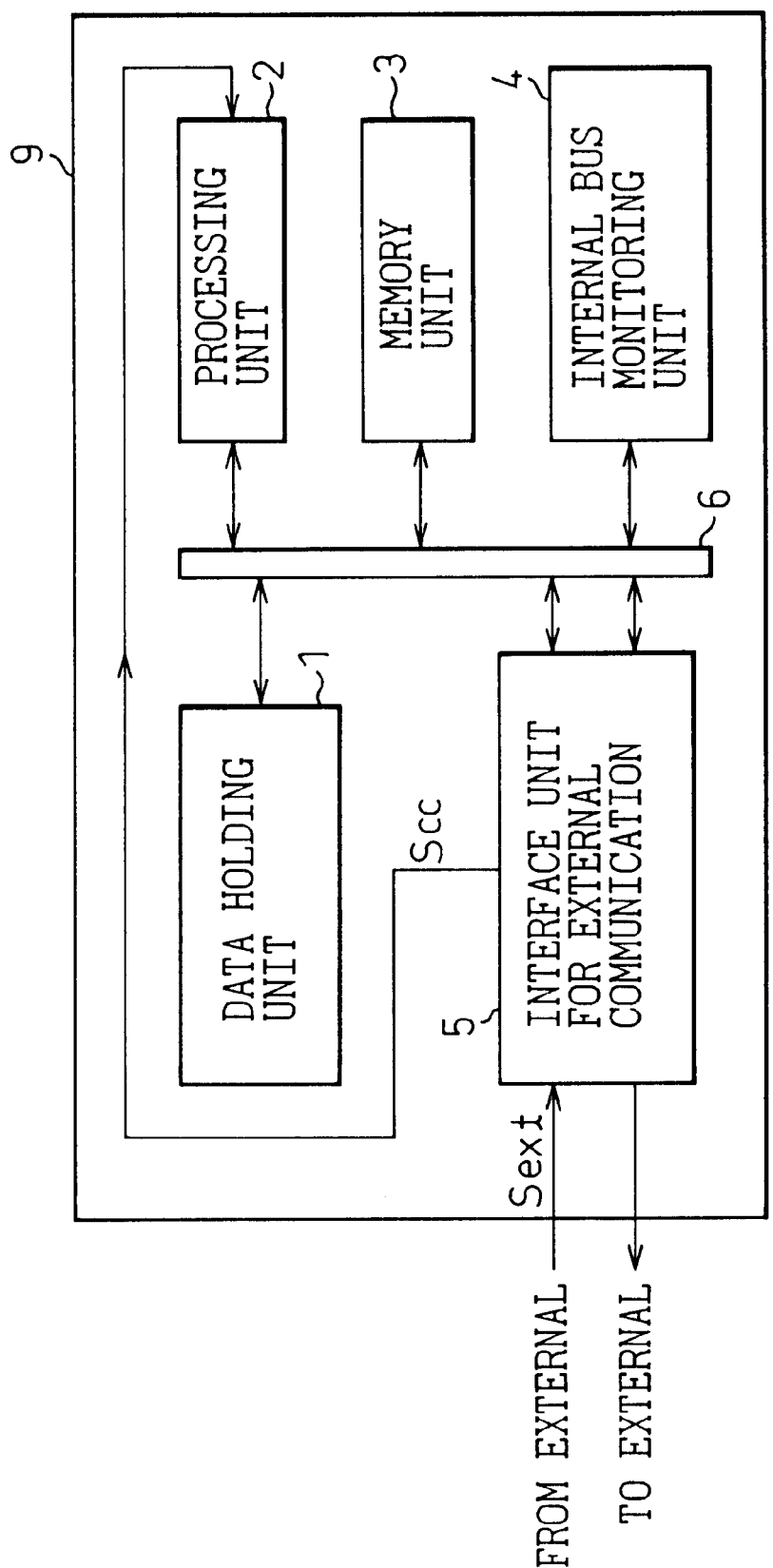
FIG. 3 is a block diagram showing the construction of a basic embodiment based on the first principle of the present invention.

FIG. 3 is a block diagram showing the construction of the basic embodiment based on the first principle of the present invention. Here, an apparatus for estimating a microcontroller according to the present invention will be demonstrated in a simplified form.

The estimation apparatus of the microcontroller in the basic embodiment based on the first principle of the present invention includes, as shown in FIG. 3, a data holding unit 1 for holding arbitrary data rewritably, a processing unit 2 for processing the arbitrary data by operating the microcontroller on the basis of a control signal Scc, an interface unit 5 for external communication, that receives signals Sext supplied from the external, extracts the control signal Scc and sends it to the processing unit 2, and an internal bus monitoring unit 4 for monitoring the state of an internal bus 6 for connecting mutually the data holding unit 1, the processing unit 2 and the external communication interface unit 5. These constituent elements are assembled in one device (that is shown as an estimation device 9 in FIG. 3).

The processing unit 2 writes the state of the internal bus 6 at the time when the microcontroller is operated on the basis of the control signal Scc, into the internal bus monitoring unit 4 through the external communication interface unit 5, and inputs the data written into this internal bus monitoring unit 4 to the data holding unit 1 or sends it to the external. The estimation device 9 further includes a memory unit 3 for temporarily storing a program contained in the signals Sext supplied from the external.

In the basic embodiment based on the first principle shown in FIG. 3, the external communication interface 5 preferably includes a serial/parallel interface circuit that contains a serial interface for processing signals of a serial form and a parallel interface for processing signals of a parallel form.

In the basic embodiment based on the first principle shown in FIG. 3, the terminals of each of the serial interface and the parallel interface in the s serial/parallel interface circuit preferably function also as the terminals that can handle the signals used for a general-purpose port.

In the basic embodiment based on the first principle shown in FIG. 3, when the terminals of each of the serial interface and the parallel interface in the serial/parallel interface circuit function also as the terminals that handle input/output signals other than the signals used for the general-purpose port, these terminals can be switched preferably to the terminals that handle the input/output signals other than the signals used for the general-purpose port, while the serial interface and the parallel interface are used.

In the basic embodiment based on the first principle shown in FIG. 3, the positions of the terminals of the serial interface in the serial/parallel interface circuit are preferably not fixed but can be switched to a plurality of positions.

Preferably, the basic embodiment based on the first principle shown in FIG. 3 is not equipped with a peripheral circuit for processing the signals of the parallel form that are sent from the parallel interface inside the serial/parallel interface circuit, and the signals supplied from the external are all transferred through the serial interface.

In the basic embodiment based on the first principle shown in FIG. 3, the data holding unit 1 preferably comprises a ROM which is capable of electrically rewriting the data.

Preferably, the basic embodiment based on the first principle of the present invention is equipped with an, on-board write interface having a function of rewriting the data in the ROM while the device is mounted onto the board.

When the data written into the internal bus monitoring unit 4 is sent to the external, the basic embodiment based on the principle shown in FIG. 3 preferably provides a security function by imparting a predetermined password to the signals supplied from the external (e.g., an external device).

An explanation is given more concretely below. In the estimation apparatus of the basic embodiment based on the first principle of the present invention shown in FIG. 3, the data holding unit 1 such as a rewritable ROM, the processing unit 2 such as a CPU, the memory unit 3 such as a RAM, the external communications interface unit 5 such as the serial/parallel interface circuit and the internal bus monitoring unit 4 for monitoring the state of the internal bus 6, such as an internal bus monitoring RAM, are formed in one estimation device, and provides a one-chip microcontroller.

When program estimation such as program debugging is executed in such one-chip microcontroller, the external communication interface unit 5 processes the signals Sext supplied from the external ICE, etc., takes out the control signal Scc and a program for program debugging, and transfers them to the processing unit 2 and to the memory unit 3. The processing unit 2 writes the program for debugging program into the memory unit 3, and operates the microcontroller by serially reading out the programs stored in this memory unit 3. The processing unit 2 serially writes the state of the internal bus 6 into the internal bus monitoring unit 4 while the microcontroller is being operated in this way (that is, it traces the state of the internal bus 6). The data written into the internal bus monitoring unit 4 in this way are either inputted to the data holding unit 1 through the external communication interface unit 5, or sent to the external ICE, or the like.

When the content of the data held in the data holding unit 1 or the content of the data sent to the external ICE, etc., is read out, program estimation of the microcontroller such as program debugging can be executed easily.

On the other hand, when the user-generated system estimation is executed in such a one-chip microcontroller, the external communication interface unit 5 processes the signals supplied from the external, takes out the control signal and the system estimation program, and transfers them to the processing unit 2. The processing unit 2 writes the system estimation program into the data holding unit 1 on the basis of the control signal Scc while the estimation device (chip) is mounted to the estimation board. In this case, the system estimation program is written into the data holding unit 1 through the external communication interface unit 5, or through an on-board write interface (which will be explained later with reference to FIG. 5).

The processing unit 2 serially reads the system estimation program stored in the data holding unit 1 and operates the microcontroller. The processing unit 2 further writes the state of the internal bus 6 at the time when the microcontroller is operated, into the internal bus monitoring unit 4. The data written in this way into the internal bus monitoring unit 4 is inputted to the data holding unit 1 through the external communication interface unit 5, or is sent to the external. The user-generated system estimation can be executed easily by reading the content of the data held by the data holding unit 1 or the content of the data sent to the external. In this case, the data holding unit 1 is allowed to function as a mask ROM, and the user-generated system estimation can be executed efficiently in the same environment as the environment in which a mass-produced device having the mask ROM formed thereon is mounted to the system board.

In summary, the estimation apparatus of the basic embodiment based on the first principle of the present invention can easily execute the program estimation and the system estimation while the device is mounted onto the board of the user-generated system, by operating the one-chip microcontroller functioning both as the program estimation device and the system estimation device, by using the signals from the external ICE, etc., without the necessity for developing separately the program estimation device and the system estimation device.

Figure 4:
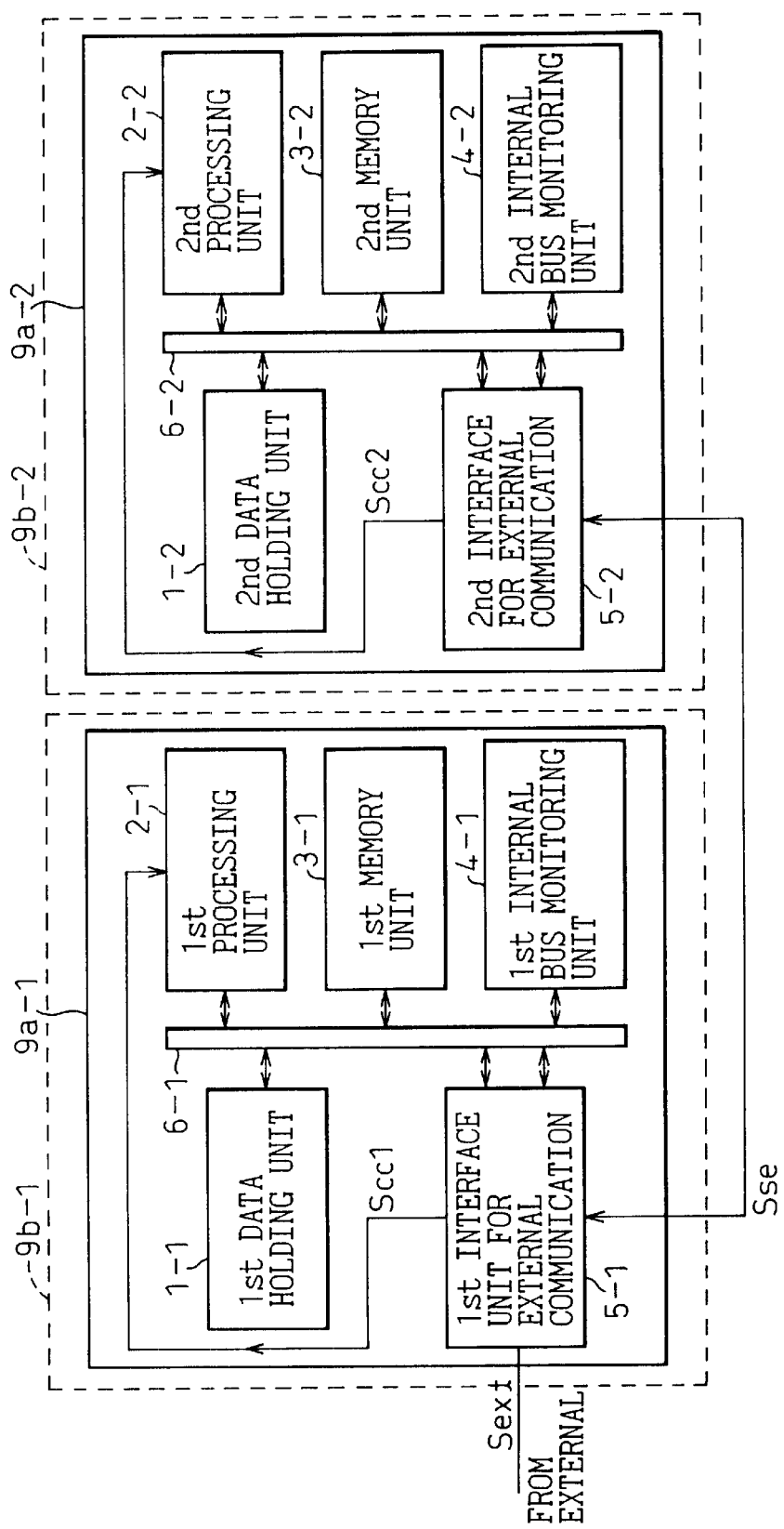
FIG. 4 is a block diagram showing the construction of a basic embodiment based on the second principle of the present invention.

FIG. 4 is a block diagram showing the construction of the basic embodiment based on the second principle of the present invention. Here, the estimation apparatus of the microcontroller according to the present invention is demonstrated in the simplified form, too.

In the estimation apparatus of the microcontroller in the basic embodiment based on the second principle, shown in FIG. 4, two estimation devices constituting the one-chip microcontroller shown in FIG. 3 are prepared (shown as the first estimation device 9a-1 and the second estimation device 9a-2 in FIG. 4). One (the first estimation device 9a-1, for example) of the estimation devices is connected to the external ICE and is used as the program estimation device. The other estimation device (the second estimation device 9a-2, for example) is used as the user-generated system estimation device.

Incidentally, when the first and second estimation, devices are fabricated in the same fabrication process, they can be accomplished on the same chip.

As shown in FIG. 4, the estimation apparatus of the microcontroller according to the basic embodiment based on the second principle of the present invention includes, in a first device (the first estimation device 9a-1, for example), the first data holding unit 1-1 for holding arbitrary data rewritably, a first processing unit 2-1 for processing the arbitrary data by operating the microcontroller on the basis of a first control signal Scc1, a first interface unit 5-1 for external communication that receives the signals Sext supplied from the external, takes out the first control signal Scc1 and sends it to the first processing unit 2-1, and a first internal bus monitoring unit 4-1 for monitoring an first internal bus 6-1 for connecting mutually the data holding unit 1-1, the first processing unit 2-1 and the first external communication interface unit 5-1.

On the other hand, the estimation apparatus includes, in the second device (the second estimation device 9a-2 shown in FIG. 4, for example), a second data holding unit 1-2 for holding arbitrary data rewritably, a second processing unit 2-2 for operating the microcontroller on the basis of a second control signal Scc2 and processing the arbitrary data, an interface unit 5-2 for external communication that receives the signals Sse supplied from the first external communication interface unit 5-1 takes out the second control signal Scc2 and sends it to the second processing unit 2-2, and a second internal bus monitoring unit 4-2 for monitoring the state of a second internal bus 6-2 for connecting mutually the second data holding unit 1-2, the second processing unit 2-2 and the second external communication interface unit 5-2.

When the program estimation of the microcontroller is executed, the first and second devices are connected through the first and second external communication interface units 5-1 and 5-2. The first processing unit 2-1 in the first device transfers the signal Sext supplied from the external to the second external communication interface unit 5-2 through the first external communication interface unit 5-1. The second processing unit 2-2 in the second device writes, into the second internal bus monitoring unit 4-2, the state of the second internal bus 6-2 at the time when the program for the program estimation, that is contained in the signals, Sse transferred to the second external communication interface unit 5-2, is operated. The second processing unit 2-2 inputs the data written into the second internal bus monitoring unit 4-2 to the first internal bus monitoring unit 4-1 in the first device or to the first data holding unit 2-1 through the second external communication interface 5-2 and through the first external communication interface unit 5-1, or sends this data to the external.

On the other hand, when the system estimation of the microcontroller is executed, the first device is cut off from the second device. The second processing unit 2-2 in the second device writes, into the second internal bus monitoring unit 4-2, the state of the internal bus 6-2 at the time when the system estimation program, that is contained in the signal written into the second data holding unit 1-2, is operated, through the second external communication interface unit 5-2, and reads out the data written into this second internal bus monitoring unit 4-2 from the second external communication interface unit 5-2.

The first device (the first estimation device 9a-1, for example) includes a memory unit 3-1 for temporarily storing the program, etc., contained in the signals Sext supplied from the external. The second device (the second estimation device 9a-2, for example) includes a memory unit 3-2 for temporarily storing the program, etc., contained in the signals Sse supplied from the first external communication interface unit 5-1 in the first device.

In the basic embodiment based on the second principle shown in FIG. 4, the first external communication interface unit 5-1 preferably includes a first serial interface for processing signals of the serial system and a first parallel interface for processing signals of the parallel system. The second external communication interface unit 5-2 preferably includes a second serial interface for processing signals of the serial system and a second parallel interface for processing signals of the parallel system. When the program estimation of the microcontroller is executed, the first and second devices are connected through the first and second serial interfaces, and the signals supplied from the external are inputted to the first parallel interface, and are transferred to the second serial interface through the first serial interface.

In the basic embodiment based on the second principle shown in FIG. 4, a first peripheral circuit for processing the signals of the parallel system sent from the first parallel interface in the first serial/parallel interface circuit is preferably disposed in the first device, and a second peripheral circuit for processing the signals of the parallel system sent from the parallel interface in the second serial/parallel interface circuit is preferably disposed in the second device.

In the basic embodiment based on the second principle shown in FIG. 4, at least one of the first and second peripheral circuits described above preferably comprises an asynchronous/synchronous communication circuit for processing the signals in an asynchronous system.

In the basic embodiment based on the second principle shown in FIG. 4, at least one of the first and second peripheral circuits comprises an asynchronous/synchronous peripheral circuit that can process the signals in an synchronous system or a clock synchronization system.

Preferably, the basic embodiment based on the second principle shown in FIG. 4 is not equipped with at least one of the first peripheral circuit for processing the signals of the parallel system sent from the first parallel interface and the second peripheral circuit for processing the signals of the parallel system sent from the second parallel interface. In this case, the signals supplied from the external are all transferred through the first and second serial interfaces.

Preferably, further, in the basic embodiment based on the second principle shown in FIG. 4, the first data holding unit 1-1 comprises a first ROM capable of electrically rewriting the data, and the second data holding unit 1-2 preferably comprises a second ROM capable of electrically rewriting the data.

Preferably, further, the basic embodiment based on the second principle shown in FIG. 4 includes, in the first device, a first on-board write interface having the function of rewriting the content of the data of the first ROM under the state in which the first device is mounted onto the first board (the first estimation board 9b-1, for example), and includes, in the second device, a second on-board write interface having the function of rewriting the content of the data in the second ROM under the state in which the second device is mounted to the second board (the second estimation board 9b-2, for example).

When at least one of the data written into the first internal bus monitoring unit 4-1 and the data written into the second internal bus monitoring unit 4-2 is sent to the external, the basic embodiment based on the second principle shown in FIG. 4 preferably provides a security function for the signals supplied from the external by the use of a predetermined password.

The explanation is given more concretely below. The first estimation device 9a-1 of the estimation apparatus of the basic embodiment based on the second principle shown in FIG. 4 includes, as built-in circuit elements, the first data holding unit 1-1 such as a rewritable ROM, the first processing unit 2-1 such as a CPU, the first external communication interface unit 5-1 such as serial/parallel interface circuit and the first internal bus monitoring unit 4-1 such as an internal bus monitoring RAM for monitoring the state of the first internal bus 6-1. The second estimation device 9a-2 includes, as the built-in circuit elements, the second data holding unit 2-1 such as a rewritable ROM, the second processing unit 2-2 such as a CPU, the second memory unit 3-2 such as a RAM, the second external communication interface unit 5-2 such as a serial/parallel circuit and the first internal bus monitoring unit 4-3 such as an internal bus monitoring RAM for monitoring the state of the second internal bus 6-2.

Each of the first and second estimation devices 9a-1 and 9a-2 has substantially the same construction as that of the estimation device 9 (FIG. 3) described above. In this case, it becomes easy to provide the program development environment and the user-generated system estimation environment when two estimation devices constituting the one-chip microcontroller are prepared, and the first estimation device 9a-1 is used as the program estimation device having the interface function with the external ICE and the second estimation device 9a-1, as the system estimation device. Incidentally, devices fabricated by the same fabrication process can be used as the first and second estimation devices described above.

When the program estimation such as program debugging is executed in the estimation apparatus of the microcontroller comprising the two estimation devices described above, the external ICE or the like and the first estimation device 9a-1 are connected through the first external communication interface unit 5-1. Furthermore, the first estimation device 9a-1 and the second estimation device 9a-2 are connected through the first and second external communication interfaces 5-1 and 5-2.

In the construction described above, the first external communication interface unit 5-1 in the first estimation device 9a-1 gains access to the signals Sext supplied from the external ICE, etc., takes out the first control signal Scc (a command signal of the program for program debugging, for example) and transfers it to the first processing unit 2-1. The first processing unit 2 transfers the external signals Sext from the external to the second external communication interface unit 5-2 in the second estimation device 9a-2 through the first external communication interface 5-1 on the basis of the first control signal Scc1.

This second external communication interface unit 5-2 gains access to the signal Sse transferred from the first estimation device 9a-1, takes out the second control signal Scc2 and transfers it to the second processing unit 2-2. The second processing unit 2-2 writes the program for program debugging contained in the signal Sse into the second data holding unit 1-2 under the state where the second estimation device 9a-2 is mounted to the second estimation board 9b-2, on the basis of the second control signal Scc2. In this case, the program for program estimation is written into the second data holding unit 1-2 through the second external communication interface unit 5-2 or through a second on-board write interface (that will be described later with reference to FIG. 6).

The second processing unit 2-2 serially reads the program stored in the second data holding unit 1-2 and operates the microcontroller. Furthermore, the second processing unit 2-2 serially writes the state of the second internal bus 6-2, at the time when the microcontroller is operated, into the second internal bus monitoring unit 4-2. (That is to say, the second processing unit 2-2 traces the state of the second internal bus 6-2). The data written into the second internal bus monitoring unit 4-2 in this way is inputted to the first internal bus monitoring unit 4-1 or to the first data holding unit 1-1 of the first estimation device 9a-1, or is sent to the external ICE, etc., through the second and first external communication interface units 5-2 and 5-1.

The program estimation, such as program debugging, of the microcontroller can be easily executed in the form in which the device is mounted to the board of the user-generated system, when the content of the data held in the first internal bus monitoring unit 4-1 or the first data holding unit 1-1, or the content of the data sent to the external ICE, etc., are read out.

When the user-generated system estimation is executed in the estimation apparatus of the microcontroller comprising the two estimation devices described above, on the other hand, the external ICE, etc., and the first estimation device 9a-1 are cut off from the second estimation device 9a-2. The second external communication interface unit 5-2 in the second estimation device 9a-2 processes the signals supplied from the external, takes out the second control signal Scc2, and transfers it to the second processing unit 2-2. The second processing unit 2-2 writes the system estimation program into the second data holding unit 1-2 on the basis of the second control signal Scc2 while the second estimation device 9a-2 is mounted to the second estimation board 9b-2. In this case, the program for the system estimation is written into the second data holding unit 1-2 through the second external communication interface unit 5-2 or the second on-board write interface.

The second processing unit 2-2 serially reads out the program for the system estimation stored in the second data holding unit 1-2, and operates the microcontroller. The second control unit 2-2 serially writes the state of the second internal bus 6-2, during the period in which the microcontroller is operated, into the second internal bus monitoring unit 4-2. The data written into the second internal bus monitoring unit 4-2 in this way are inputted to the second data holding unit 1-2 through the second external communication interface unit 5-2 or are sent to the external.

The user-generated system estimation can be easily conducted when the content of the data held in the second data holding unit 1-2 or the content of the data sent to outside is read. In this case, the user-generated system estimation can be executed efficiently in the same environment as in the case in which the mass-produced devices having the mask ROM formed thereon are mounted to the board of the system, by allowing the second data holding unit 1 in the second estimation device 9a-2 to function as the mask ROM in the same way as in the case shown in FIG. 3.

In summary, the estimation apparatus according to the basic embodiment based on the second principle of the present invention can easily execute the program estimation and the system estimation while the devices are mounted onto the board for estimation of the user-generated system, by using one of the two estimation devices as the system estimation device on the user-generated system, and the other as the program estimation device having the interface function with the external ICE, in the same way as in the case shown in FIG. 3.

The estimation method of the microcontroller, that is executed by using the estimation apparatus of the basic embodiment based on the first principle of the present invention, integrates (or assembles) a data holding unit for holding arbitrary data rewritably, a processing unit for processing the arbitrary data by operating a microcontroller, an external communication interface unit for receiving and processing the signals supplied from the external and an internal bus monitoring unit for monitoring the state of an internal bus, into one device, writes the state of the internal bus at the time when the microcontroller is operated on the basis of the control signal taken out from the signals supplied from the external, into the internal bus monitoring unit, and inputs the data written into the internal bus monitoring unit to the data holding unit, or sends it to the external.

The estimation method of a microcontroller, that is executed by using the estimation apparatus of the basic embodiment based on the second principle of the present invention, integrates, into a second device, a first data holding unit for holding arbitrary data rewritably, a first processing unit for processing the arbitrary data by operating a microcontroller, a first external communication interface unit for receiving and processing the signals supplied from the external, and a first internal bus monitoring unit for monitoring the state of a first internal bus, also integrates, into a second device, a second data holding unit for holding arbitrary data rewritably, a second processing unit for processing the arbitrary data by operating the microcontroller, a second external communication interface unit for receiving and processing the signals supplied from the external, and a second internal bus monitoring unit for monitoring the state of a second internal bus, wherein, when program estimation of the microcontroller is executed, the signal supplied from the external through the first external communication interface unit is transferred to the second external communication interface unit in the first device, while the state of the second internal bus at the time when the program for program estimation, that is contained in the signals transferred to the second external communication! interface unit, is operated, is written into the second internal bus monitoring unit, in the second device, and the data written into the second internal bus monitoring unit is inputted to the first internal bus monitoring unit, or to the first data holding unit in the first device through the second and first external communication interface units, or is sent to the external.

When the system estimation of the microcontroller is executed, on the other hand, the first device is cut off from the second device. In the second device, the state of the second internal bus at the time when the program for system estimation, that is contained in the signals written into the second data holding unit, is operated, is written into the second internal bus monitoring unit through the second external communication interface unit, and the data written into the second internal bus monitoring unit is read out from the second external communication interface unit.

The estimation apparatus of the microcontroller and the estimation method thereof according to the basic embodiment of the present invention can easily execute the program estimation and the system estimation in the form in which the program estimation device and the system estimation device are mounted to the board of the user-generated system. Therefore, the program estimation device and the system estimation device need not be developed separately, but they can be developed within a short time. In this case, the program estimation device and the system estimation device can be developed by developing only one kind of the devices, and the user can now execute a timely system design. Therefore, the basic embodiment contributes greatly to the reduction of TAT (Turnaround Time). In other words, this embodiment can sufficiently satisfy the user's requirement for the device development within a short time when the user executes the system design.

The estimation apparatus of the microcontroller and the estimation method thereof according to the basic embodiment of the present invention can efficiently execute the program estimation and the user-generated system estimation in the same environment as when the mass-produced devices are mounted to the system board. Therefore, the shift from the program development and the system development to mass production can be easily carried out. Particularly, mass production of chips can be conducted rapidly by using flash microcontroller having the system estimation device assembled therein.

Figure 5:
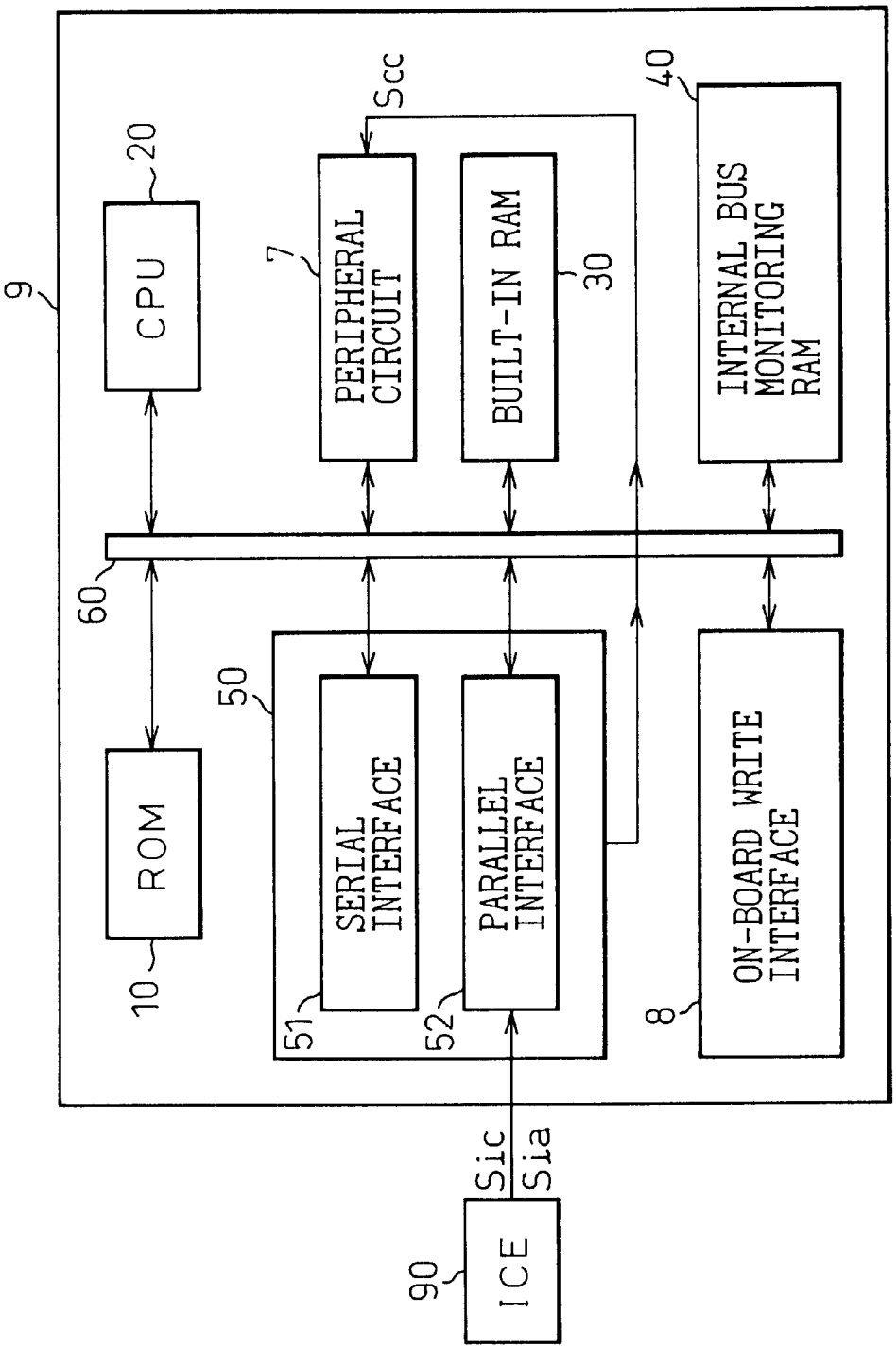
FIG. 5 is a block diagram showing the construction of the first preferred embodiment of the present invention.

FIG. 5 is a block diagram showing the construction of the first preferred embodiment of the present invention. This drawing shows a concrete example of the microcontroller on the basis of the first principle shown in FIG. 3.

In FIG. 5, one-chip microcontroller is constituted by using one estimation device 9, and the estimation device of the microcontroller according to the present invention is accomplished by this one-chip microcontroller. The data holding unit 1 (FIG. 3) of this invention in the one-chip microcontroller comprises a ROM 10 capable of electrically rewriting the data. A flash ROM is preferably used for this ROM 1.

In FIG. 5, the processing unit 2 of this invention (FIG. 3) comprises a CPU 20 for processing arbitrary data by operating the program on the basis of the control signal Scc. The external communication interface unit 5 of the present invention (FIG. 3) comprises a serial/parallel interface circuit 50 containing a serial interface 51 for processing the signals of the serial form and transferring them to the ROM 10 and the CPU 20, and a parallel interface 52 for processing the signals of the parallel form and transferring them to the ROM 10 and the CPU 20. Here, address/data signals Sia, various control signals and an input signal Sic for program debugging, that are supplied from the external ICE 90, are first transferred to the parallel interface 52, are then converted to the signals of the serial form and are thereafter transferred to the ROM 10 and the CPU 20.

In FIG. 5, the memory unit 3 of this invention. (FIG. 3) comprises a built-in RAM 30 for temporarily storing the program, etc., contained in the address/data signals Sia supplied from the external ICE 90. The estimation apparatus according to the first preferred embodiment shown in FIG. 5 is equipped further with a peripheral circuit 7 (a circuit having the functions of the CPU 20 such as a command register, a command decoder and a machine cycle encoder, for example) for processing the signals of the parallel form sent from the parallel interface 52 inside the serial/parallel interface circuit 50.

The estimation apparatus according to the first preferred embodiment shown in FIG. 5 is further equipped with an on-board write interface 8 having a function of rewriting the content of the data in the ROM 10 while the estimation device 9 is mounted to the board of the user-generated system. Incidentally, the function of this on-board write interface 8 is fabricated, in some cases, as a part of the serial/parallel interface circuit 5.

In FIG. 5, the CPU 20, the built-in RAM 30, the serial/parallel interface circuit 50, the peripheral circuit 7, the rewritable ROM 10 and the on-board write interface 8 are connected to one another through an address data bus 60. An internal bus monitoring RAM 40 for tracing the state of the address data bus 60 by operating the program is formed in the estimation device 9, and this internal bus monitoring RAM 40, too, is, connected to the address data bus 60. When these CPU 20, built-in RAM 30, serial/parallel interface circuit 50, peripheral circuit 7, rewritable ROM 10, on-board write interface 8 and internal bus monitoring RAM 40 are formed inside one estimation device 9, a one-chip microcontroller is provided.

When program debugging is executed on the ICE side in the construction shown in FIG. 5, the estimation apparatus is set to a tool mode using the external terminals. Thereafter, the serial/parallel interface circuit 50 processes the signals supplied from the ICE 90, takes out the control signal Scc and the program for program debugging, and transfers them to the CPU 20 and to the built-in RAM 30. The CPU 20 writes the program for program debugging into the built-in RAM 30 on the basis of the control signal Scc, serially reads out the program stored in this built-in RAM 30 and operates the microcontroller. Furthermore, the CPU 20 traces the state of the address data bus 60 at the time when the microcontroller is operated, by using the internal bus monitoring unit 4. The data written into the internal bus monitoring RAM 40 as a result of such a trace operation is inputted to the rewritable ROM 10 through the serial interface 51, or is sent to the ICE 90 through the terminals connected to the parallel interface 52.

Program debugging of the microcontroller can be executed easily as the content of the data stored in the ROM 10 or the content of the data sent to the ICE 90 is read out.

When the user-generated system estimation is executed in the construction shown in FIG. 5, on the other hand, the estimation apparatus is set to the normal operation mode by using the external terminals. Thereafter, the serial/parallel interface circuit 50 processes the signals supplied from the external, takes out the control signal Scc and the program for system estimation, and transfers them to the CPU 20. The CPU 20 writes the system estimation program into the rewritable ROM 10 on the basis of the control signal Scc under the state where the estimation device 9 is mounted to the estimation board. In this case, the system estimation program is written into the ROM 10 through the on-board write interface 8. Here, the built-in RAM 30 generally has the function of a flash writer, and the write operation of the system estimation program into the ROM 10 can be easily done by utilizing this flash writer function.

The CPU 20 serially reads out the system estimation program stored in the ROM 10 and operates the microcontroller. The CPU 20 traces the state of the address data bus 60, at the time when the microcontroller is operated, by using the internal bus monitoring unit 4. The data written into the internal bus monitoring RAM 40 as a result of such a trace operation is inputted to the ROM 10 through the serial interface 51, or is sent to the ICE 90 through the terminals connected to the parallel interface 52.

The user-generated system estimation in the normal operation mode can be executed&easily as the content of the data held in the ROM 10 or the content of the data sent to the ICE 90 is read out. In this case, the user-generated system estimation can be executed efficiently in the same environment as in the case in which the mass-produced device having the mask ROM formed thereon is mounted to the board of the system, by allowing the ROM 10 to function as a mask ROM.

When the estimation device 9 is, as such, shipped as a product, the third party other than the program developer is able to read out easily the content of the data written into the internal bus monitoring RAM 40 and the ROM 10 and to decode the program. To avoid such a possibility, passwords are provided in the internal bus monitoring RAM 40 and the ROM 10 lest the third party other than the program developer can read out the contents of the internal bus monitoring RAM 40 and the ROM 10. In this way, the estimation device 9 is furnished with the security function.

When the CPU, the ROM and the internal bus monitoring RAM assembled in the estimation device are operated in the estimation apparatus preferably having the construction shown in FIG. 5, there is provided the first estimation method of the microcontroller according to the present invention that can easily execute program debugging and user-generated system estimation in the same environment as when the mass-produced device is mounted to the system board.

Figure 6:
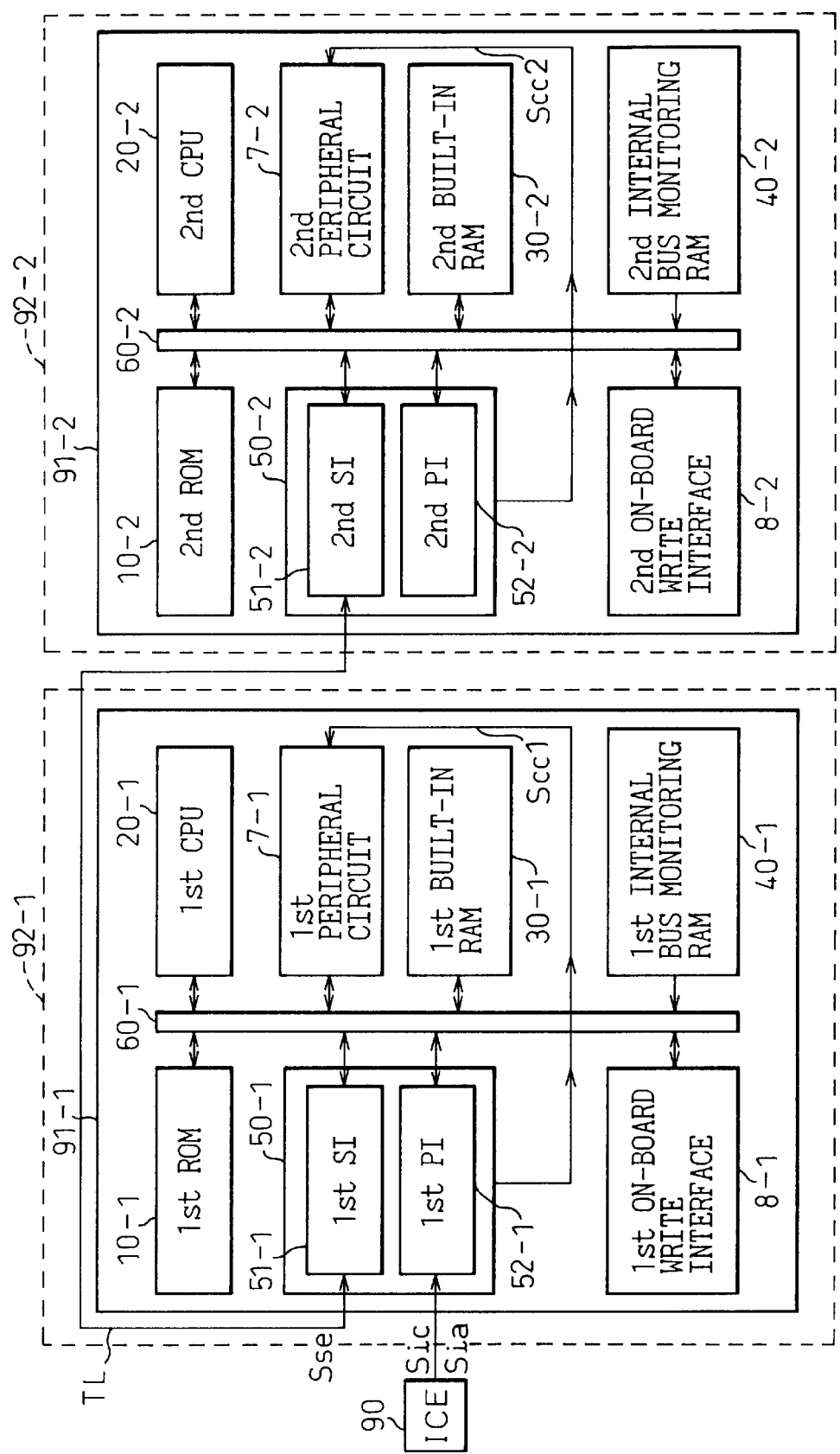
FIG. 6 is a block diagram showing the construction of the second preferred embodiment of the present invention.

FIG. 6 is a block diagram showing the construction of the second preferred embodiment of the present invention. The drawing shows the first concrete example of the estimation apparatus of the microcontroller of the basic embodiment based on the second principle shown in FIG. 4.

In FIG. 6, two devices (a program estimation device 91-1 and a system estimation device 912) each having substantially the same construction as that of the estimation device shown in FIG. 4 are prepared. The program estimation device used for program debugging (that is, ICE-dedicated device) 91-1 is mounted to the program estimation board 92-1 while it is connected to the external ICE. The system estimation device used for the user-generated system estimation (that is, a target device) 91-2 is mounted to the system estimation board 92-2.

In FIG. 6, further, the first data holding unit 1-1 (FIG. 4) of the present invention comprises a first ROM 10-1 capable of electrically rewriting the data in the program estimation device, and the second data holding unit 1-2 (FIG. 4) of the present invention comprises a second ROM 10-2 capable of electrically rewriting the data in the system estimation device. Each of these first and second ROMs 10-1 and 10-2 preferably uses a flash ROM.

The first processing unit 2-1 (See FIG. 4) of the present invention shown in FIG. 6 comprises a first CPU 20-1 for processing arbitrary data by operating the program on the basis of the first control signal Scc1 inside the program estimation device. The second processing unit 2-2 (FIG. 4) of the present invention comprises a second CPU 20-2 for processing arbitrary data by operating the program on the basis of the second control signal Scc2 in the system estimation device.

In the program estimation device 91-1 shown in FIG. 6, the first external communication interface unit 5-1 (FIG. 4) of the present invention comprises a first serial/parallel interface circuit 50-1 containing a first serial interface (which is sometimes abbreviated as "SI" in the drawings) that processes the signals of the serial form and transfers them to the first ROM 10-1, to the first CPU 20-1 and to the serial/parallel interface circuit 50-2 in the system estimation device 91-2, and a first parallel interface 52-1 (which is sometimes abbreviated as "PI" in the drawings) that processes the signals of the parallel form and transfers them to the first ROM 10-1, to the first CPU 20-1, and so forth.

On the other hand, the second external communication interface unit (FIG. 4) in the system estimation device 91-2 of the present invention comprises a second serial/parallel interface circuit 50-2 containing a second serial interface 51-2 that processes the signals of the serial form supplied from the first serial interface 5-1, etc., and transfers them to the second ROM 10-2 and the second CPU 20-2, and a second parallel interface 52-2 that processes the signals of the parallel form and transfers them to the second ROM 10-2 and the second CPU 20-2.

Here, the address/data signals Sia supplied from the external CE 90, various control signals and the input signal Sic for program debugging are transferred to the first parallel interface 52-1, are then converted to the signals of the serial form and are transferred to the first ROM 10-1 and to the first CPU 20-1. The signals of the serial form are transferred to the second serial interface 51-2 through the first serial interface 51-1 and the serial signal line TL. On the other hand, the signals of the serial form that are read out from the second serial interface 51-2 are transferred to the first serial interface 51-1 through the serial signal line TL.

In the program estimation device 91-1 shown in FIG. 6, the first memory unit 3-1 (FIG. 4) of the present invention comprises a first built-in RAM 30-1 for temporarily storing the program, etc., contained in the address/data signals Sia supplied from the external ICE 90. In the program estimation device 91-1 shown in FIG. 6, there is disposed a first peripheral circuit 7-1 (a circuit having the function of controlling the operation of the CPU 20-1 such as a command register, a command decoder and a machine cycle encoder, for example) for processing the signals of the parallel form (for example, the first control signal Scc1) sent from the first parallel interface 52-1 in the first serial/parallel interface circuit 50-1.

In the system estimation device 91-2 shown in FIG. 6, on the other hand, the second memory unit 3-2 (FIG. 4) of the present invention comprises a second built-in RAM 30-2 for temporarily storing the program contained in the address data signals Sia supplied from the external ICE 90. In the system estimation device 91-2 shown in FIG. 6, there is disposed a second peripheral circuit 7-2 (a circuit having the operation functions of the second CPU 20-2 such as a command register, a command decoder and a machine cycle encoder) for processing the signals of the parallel form (for example, the second control signal Scc2) sent from the second parallel interface 52-2 in the second serial/parallel interface circuit 50-2.

The estimation apparatus according to the second embodiment shown in FIG. 6 further includes a first on-board write interface 8-1 having the function of rewriting the content in the first ROM 10-1 while the program estimation device 91-1 is mounted onto the program estimation board on the side of the program estimation device. The estimation apparatus according to the second embodiment shown in FIG. 6 further includes a second on-board write interface 8-2 having the function of rewriting the content of the data in the second ROM 10-2 while the system estimation device 91-2 is mounted onto the system estimation board on the side of the system estimation device. The functions of these first and second on-board write interfaces 8-1 and 8-2 are sometimes generated as a part of the first and second serial/parallel interface circuits 50-1 and 50-2, respectively.

In FIG. 6, the first CPU 20-1, the first built-in RAM 30-1, the first serial/parallel interface circuit 50-1, the first peripheral circuit 7-1, the rewritable first ROM 10-1 and the on-board write interface 8-1 are connected to one another through a first address data bus 60-1. A first internal bus monitoring RAM 40-1 for tracing the state of the first address data bus 60-1 by operating the program is formed in the program estimation device 91-1. This internal bus monitoring RAM 40-1, too, is connected to the first address data bus 60-1. A one-chip microcontroller is provided when the first CPU 20-1, the first built-in RAM 30-1, the first serial/parallel interface circuit 50-1, the first peripheral circuit 7-1, the rewritable first ROM 10-1, the first on-board write interface 8-1 and the first internal bus monitoring RAM 40-1 are assembled in the program estimation device 91-1.

In FIG. 6, on the other hand, the second CPU 20-2, the second built-in RAM 30-2, the second serial/parallel interface circuit 50-2, the second peripheral circuit 7-2, the rewritable second ROM 10-2 and the on-board write interface 8-2 are connected to one another through the second address data bus 60-2. A second internal bus monitoring RAM 40-2 for tracing the state of the second address data bus 60-2 by operating the program is formed in the system estimation device 91-2. This second internal bus monitoring RAM 40-2, too, is connected to the second address data bus 60-2. Another one-chip microcontroller is provided when the second serial/parallel interface circuit 50-2, the second peripheral circuit 7-2, the rewritable second ROM 10-2, the second on-board write interface 8-2 and the second internal bus monitoring RAM 40-2 are assembled in the program estimation device 91-2.

When program debugging is executed on the ICE side in the estimation apparatus comprising the two estimation devices, that is, the program estimation device and the system estimation device, the estimation apparatus is first set to the tool mode by using the external terminals. The external ICE 90 and the program estimation device 91-1 are then connected through the first serial/parallel interface circuit 501. The program estimation device 91-1 and the system estimation device 91-2 are connected through the first serial/parallel interface circuit 50-1 and the second serial/parallel interface circuit 50-2.

In the construction described above, the first serial/parallel interface circuit 50-1 in the program estimation device 91-1 processes the signals supplied from the external ICE 90, takes out the first control signal Scc1 and the program for program debugging, and transfers them to the first CPU 20 and to the first built-in RAM 30-1. The first CPU 20-1 writes the program for program debugging into the first built-in RAM 30-1 on the basis of the first control signal Scc1. The program stored in the first built-in RAM 30-1 is converted to the signal Sse of the serial form, and is then transferred to the second serial/parallel interface circuit 50-2 in the program estimation device 91-1 through the first serial interface 51-1 and through the serial signal transfer line TL.

The second serial/parallel interface circuit 50-2 processes the signal Sse transferred from the program estimation device 91-1, takes out the second control signal Scc2 and transfers it to the second CPU 20-2. The second CPU 20-2 writes the program for program debugging, that is contained in the signal Sse, into the second ROM 10-2 while the system estimation device 91-2 is mounted to the system estimation board 92-2. In this case, the program for program estimation is written into the second ROM 10-2 through the Second serial/parallel interface circuit 50-2 or through the second on-board write interface 8-2.

The second CPU 20-2 serially reads out the program stored in the second ROM 10-2 and operates the microcontroller. The second CPU 20-2 traces the state of the second address data bus 60-2 while the microcontroller is operated, by using the second internal bus monitoring RAM 40-2. As a result of such a tracing operating, the data written into the second internal bus monitoring RAM 40-2 is inputted to the first internal bus monitoring RAM 40-1 or to the first ROM 10-1 inside the program estimation device 91-1 through the second and first serial/parallel interface circuits 50-2 and 50-1, or is sent to the external ICE 90.

Program debugging of the microcontroller can be executed easily while the system estimation device is mounted to the board for user-generated system estimation, when the content of the data stored in the first internal bus monitoring RAM 40-1 or in the first ROM 10-1 or the content of the data sent from the external ICE 90 is read out by using the first serial interface 51-1 of the program estimation device 91-1.

Here, explanation is given for the case in which the data on program debugging is read out by using the terminals used for the second serial interface 51-2 of the system estimation device 91-2. In this case, the tool control register is set as the switching portion of the second serial interface 51-2 so that the data output can be distributed to other external terminals. It is necessary in this case to connect the tool control terminal and the external terminal of the estimation device in accordance with the value of the switching bit of the terminal, and thus to switch the signals by the external board.

On the other hand, when user-generated system estimation after program debugging is executed in the estimation apparatus comprising the two estimation devices described above, the estimation apparatus is set to the normal operation mode using the external terminals. The external ICE 90 and the program estimation device 91-1 are then cut off from the system estimation device 91-2. The second serial/parallel interface circuit 50-2 in the system estimation device 91-2 processes the signals supplied from the external, takes out the second control signal Scc2 and transfers it to the second CPU 20-2. The second CPU 20-2 writes the program for system estimation into the second ROM 10-2 while the system estimation device 91-2 is mounted to the system estimation board 92-2, on the basis of the second control signal Scc2. In this case, the program for system estimation is written into the second ROM 10-2 through the second serial/parallel interface circuit 50-2 or the second on-board write interface 8-2.

Here, the second built-in ROM 30-2 inside the system estimation device 91-2 generally has the function of a flash writer. Therefore, the program for system estimation can be written easily into the second ROM 10-2 by utilizing this flash writer.

The second CPU 20-2 serially reads out the program for system estimation that is stored in the second ROM 10-2, and operates the microcontroller. The second CPU 20-2 traces the state of the second address data bus 60-2 while the microcontroller is operated, by utilizing the second internal bus monitoring RAM 40-2. The data so written into the second internal bus monitoring RAM 40-2 as a result of such a tracing operation is inputted to the second ROM 10-2 through the second serial interface 51-2, or is sent to the external through the terminal connected to the second parallel interface 52-2.

The user-generated system estimation can be executed easily by using the two estimation devices as the content of the data stored in the second ROM 10-1 or the content of the data sent the external is read out and system debugging is, executed in the normal operation mode. In this case, the user-generated system estimation can be executed efficiently in the same environment as in the case in which the mass produced devices having the mask ROM are mounted to the system board, by allowing the second ROM 10-2 in the system estimation device 91-2 to function as the mask ROM. The operation result of the program for system estimation is stored in the second ROM 10-2 in this case, and when the data of the second ROM 10-2 is read out using the second parallel interface 52-2, the system having the microcontroller mounted thereto can be estimated. Estimation of the voltage levels of the terminals of the microcontroller, estimation of the initial state of the system, and so forth, can be executed in this case by utilizing the program for system estimation.

When the program estimation device and the system estimation devices are shipped, as they are, as products after system debugging is executed in the normal operation mode, a third party other than the program developer might easily read out the content of the data written into the internal bus monitoring RAM and the ROM, and might decode the program. To avoid such a possibility, passwords are imparted to the internal bus monitoring RAM and the ROM in the same way as in the first preferred embodiment (FIG. 5) lest the third party other than the program developer can read out the content of the internal bus monitoring RAM and the ROM. In this way, the program estimation device and the system estimation device are furnished with the security function.

The second estimation method of a microcontroller according to the present invention preferably uses the estimation apparatus having the construction shown in FIG. 6, operates the CPU, the ROM and the internal bus monitoring RAM assembled in each of the program estimation device (ICE-dedicated device) and the system estimation device, and transfers the signals between the ICE and the two devices through the serial interfaces. In this way, the second estimation method of the present invention can easily execute efficient program debugging and user-generated system estimation in the same environment as when the mass-produced devices are mounted to the system board.

Figure 7:
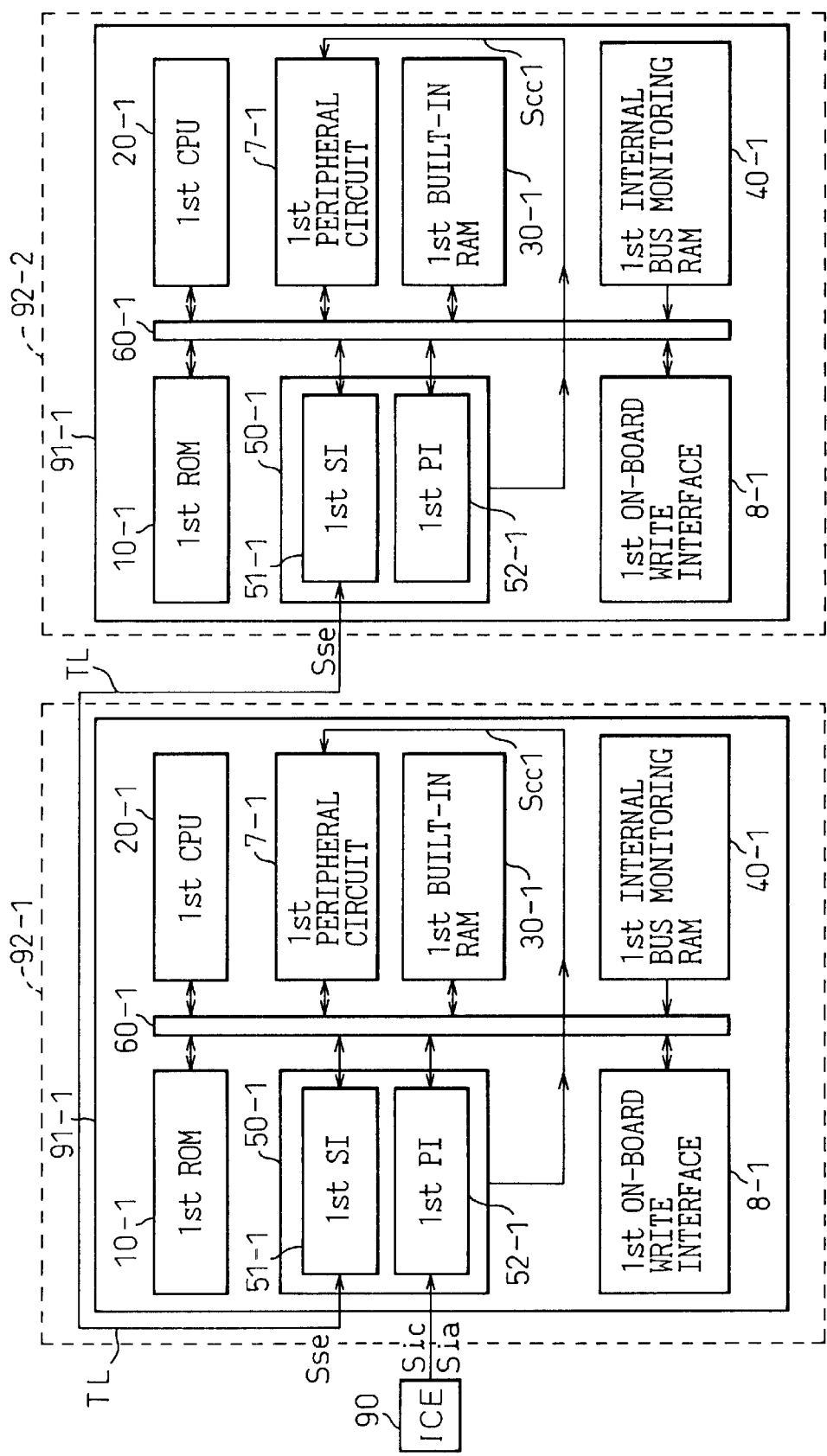
FIG. 7 is a block diagram showing a modified form of the embodiment shown in FIG. 6.
Figure 8:
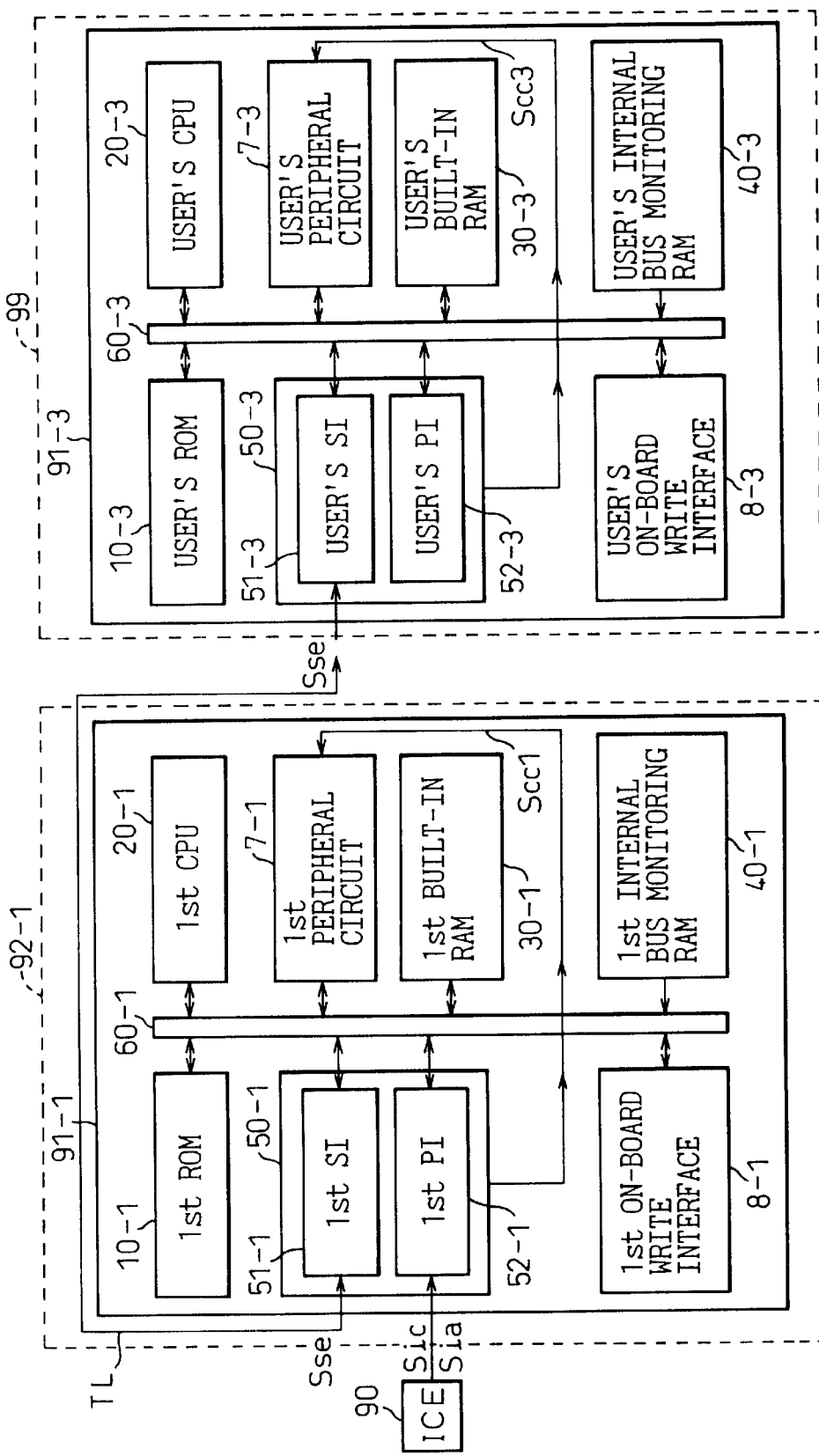
FIG. 8 is a block diagram showing the construction for executing re-estimation of the device after it is mounted to a system estimation board, by the use of the program estimation device shown in FIG. 7.

FIG. 7 is a block diagram showing an improved form of the embodiment shown in FIG. 6. FIG. 8 shows a block diagram showing the construction for executing re-estimation of the device after it is mounted to the system estimation board, by using the program estimation device shown in FIG. 7. The drawings show the improved form of the estimation apparatus of the microcontroller according to the second preferred embodiment shown in FIG. 6.

In FIG. 7, the two estimation devices shown in FIG. 6 (that is, the program estimation device 91-1 and the system estimation device 91-2) are fabricated in the same fabrication process and are accomplished by the same chip. In FIG. 7, while the program estimation device 91-1 used for program debugging is connected to the external ICE, it is mounted to the program estimation board 92-1. At the same time, the program estimation device 91-1 used also for user-generated system estimation is mounted to the system estimation board 92-2.

In other words, the estimation apparatus of the microcontroller shown in FIG. 7 is different from the embodiment shown in FIG. 6 in that the system estimation device (that is, the program estimation device) fabricated in the same fabrication process as the program estimation device for program debugging is used also for user-generated system estimation. It should be noted hereby that the operations for program debugging and user-generated system estimation using such a program estimation device 91-1 (hereby called the "estimation device") are substantially the same as the operations of the embodiment shown in FIG. 6.

Explanation will be given in further detail In FIG. 7, each of the first and second data holding units 1-1 and 1-2 (FIG. 4) comprises a first ROM 10-1 capable of electrically rewriting the data. Each of the first and second processing units 2-1 and 2-2 (FIG. 4) comprises a first CPU 20-1 that operates the program on the basis of the first control signal Scc1 and processes arbitrary data.

In FIG. 7, each of the first and second interface units 5-1 and 5-2 for external communication (FIG. 4) comprises a first serial/parallel interface circuit 50-1 containing a first serial interface 51-1 for processing the signals of the serial form and transferring them to the first ROM 101, the first CPU 20-1 and the serial/parallel interface circuit 50-1 in the other estimation device, and a first parallel interface 52-1 for processing the signals of the parallel form and transferring them to the first ROM 10-1 and the first CPU 20-1.

Here, the address/data signals Sia supplied from the external ICE 90, various control signals and the input signal Sic for program debugging are transferred to the first parallel interface 52-1 in one of the estimation devices, are then converted to the signals of the serial form and are thereafter transferred to the first ROM 10-1 and the first CPU 20-1. The signals of the serial form are further transferred to the first serial interface 51-1 in one of the estimation devices through the serial interface 51-1 in one of the estimation devices and through the serial signal line TL. On the other hand, the signals of the serial form read out from the first serial interface 51-1 in the other estimation device are transferred to the first serial interface 51-1 in one of the estimation devices through the serial signal line TL.

In FIG. 7, further, each of the first and second memory units 3-1 and 3-2 (FIG. 4) of the present invention comprises a first built-in RAM 30-1 for temporarily storing the program, etc., contained in the address/data signals Sia supplied from the external ICE 90. A first peripheral circuit 7-1 is disposed further in order to process the signals of the parallel form (for example, the first control signal Scc1) sent from the first parallel interface 52-1 in the first serial/parallel interface circuit 50-1.

The estimation apparatus of the microcontroller shown in FIG. 7 is equipped with a first on-board write interface 8-1 having a function of rewriting the content of the data in the first ROM 10-1 while the estimation device is mounted to the program estimation board 92-1. The estimation apparatus is equipped with a first on-board write interface 8-1 having a function of rewriting the content of the data in the first ROM 10-1 while the estimation device is mounted to the system estimation board 92-2.

In FIG. 7, two one-chip microcontrollers can be provided when the first CPU 20-1, the first built-in RAM 30-1, the first serial/parallel interface circuit 50-1, the first peripheral circuit 7-1, the rewritable first ROM 10-1, the first on-board write interface 8-1 and the first internal bus monitoring RAM 40-1 are assembled in two estimation devices fabricated by the same chip.

When program debugging on the ICE side is executed in the estimation apparatus comprising one kind of the estimation devices described above, the estimation apparatus is set to the tool mode by using the external terminals. The external ICE 90 and the program estimation device 91-1 are connected through the first serial/parallel interface circuit 50. Furthermore, the two program estimation devices 91-1 are connected mutually through the two first serial/parallel interface circuits 50-1.

In the construction described above, the first serial/parallel interface circuit 50-1 in one of the estimation devices processes the signals supplied from the external ICE 90, takes out the first control signal Scc1 and the program for debugging program, and transfers them to the first CPU 20-1 and to the first built-in RAM 30-1. The first CPU 20-1 writes the program for program debugging into the first built-in RAM 30-1 on the basis of the first control signal Scc1. The program thus stored in the first built-in RAM 30-1 is converted to the signals Sse of the serial form and is then transferred to the first serial/parallel interface circuit 50-1 in the other estimation device through the first serial interface 51-1 and the serial signal transfer line TL.

The first serial/parallel interface circuit 50-1 in the other estimation device processes the signals Sse, takes out the first control signal Scc1 and transfers it to the first CPU 20-1. The first CPU 20-1 writes the program for program debugging contained in the signals Sse into the first ROM 10-1 while the other estimation device is mounted to the system estimation board 92-2. In this case, the program for program debugging is written into the first ROM 10-1 through the first serial/parallel interface circuit 50-1 in the other estimation device or through the first on-board write interface 8-1.

The first CPU 20-1 in the other estimation device serially reads out the program stored in the first ROM 10-1 and operates the microcontroller. The first CPU 20-1 traces the state of the first address data bus 60-1 at the time when the microcontroller is operated, by using the first internal bus monitoring RAM 40-1. The data, that is written into the first internal bus monitoring RAM 40-1 in the other estimation device as a result of such a tracing operation, is inputted to the first internal bus monitoring RAM 40-1 or to the first ROM 10-1 in one of the estimation devices through the two first serial/parallel interface circuits 50-1, or is sent to the external ICE 90.

Program debugging of the microcontroller can be easily executed, in the form in which the estimation device is mounted to the user-generated system estimation board, when the content of the data held in the first internal bus monitoring RAM 40-1 or in the first ROM 10-1, or the content of the data sent into the external ICE 90, is read out by using the first serial interface 51-1 in one of the estimation devices.

Explanation will be given hereby on the case in which the data relating to program debugging is read out using the terminals that are used for the first serial interface 51-1 in the other estimation device. In this case, the tool control register is set as the switching portion of the first serial interface 51-1 in the other estimation device so that the data output can be distributed to other external terminals. At this time, it is necessary to switch the signals by the external board by connecting the tool control terminal and other external terminals in accordance with the values of the switching bits of the terminals.

On the other hand, when user-generated system estimation, after program debugging, is executed in the estimation apparatus comprising the two estimation devices formed of the same chip, the estimation apparatus is set to the normal operation mode using the external terminals. The external ICE 90 and one of the estimation devices are then cut off from the other estimation device. The first serial/parallel interface circuit 50-1 in the other estimation device processes the signals supplied from the external, takes out the first control signal Scc1 and transfers it to the first CPU 20-1. The first CPU 20-1 writes the system estimation program into the first ROM 10-1 on the basis of the first control signal Scc1 while the other estimation device is mounted to the system estimation board 92-2. Here, the first built-in ROM 30-1 has the function of the flash writer as already described, and can easily write the system estimation program into the first ROM 10-1 by using this flash writer function.

The first CPU 20-1 serially reads out the system estimation program stored in the first ROM 10-1 and operates the microcontroller. The first CPU 20-2 traces the state of the first address data bus 60-1 at the time when the microcontroller is operated, by utilizing the first internal bus monitoring RAM 40-1. The data that is written into the first internal bus monitoring RAM 40-1 as a result of such a tracing operation is inputted to the first ROM 10-1 through the first serial interface 51-1, or is sent to outside through the terminals connected to the first parallel interface 52-1.

User-generated system estimation can be easily executed when the content of the data stored in the first ROM 10-1 or the content of the data sent to the external is read out and system debugging in the normal operation mode is executed. In this case, user-generated system estimation can be executed efficiently in the same environment as when the mass-produced devices having the mask ROM formed thereon are mounted to the system board, by causing the first ROM 10-1 inside the estimation device to function as the mask ROM. The system to which the microcontroller is mounted can be estimated when the operation result of the system estimation program in this case is stored in the first ROM 10-1 and the data of the first ROM 10-1 is read out by using the first parallel interface 52-1.

An explanation will be given more concretely below. When the microcontroller is operated discretely on the target board for user-generated system estimation, the program for system estimation is written into the flash microcontroller inclusive of the flash writer, and this flash microcontroller is operated as the estimation device. In this case, the program for system estimation is read out using the parallel interface in this flash microcontroller. Consequently, the microcontroller can be operated without connecting the ICE and the ICE board to the serial/parallel interface circuit.

When it is confirmed that the estimation device such as a flash microcontroller does not operate normally after it is shipped as a product, re-estimation of the program as well as the user target board can be executed easily while the estimation device is mounted to the user target board 99 shown in FIG. 8. Incidentally, in order to clearly distinguish the estimation device after shipment as the product from the estimation device before shipment, the estimation device under the state in which it is mounted to the user target board will be referred to as the "user system estimation device 91-3".

Quite naturally, the user-generated system estimation device 91-3 shown in FIG. 8 has the same construction as that of the aforementioned program estimation device 91-1. Speaking more concretely, the user ROM 10-3 and the user CPU 20-3 inside the user-generated system estimation device 91-3 have the same function as the first ROM 10-1 and the first CPU 20-1 in the program estimation device 91-1, respectively. The user serial/parallel interface circuit 50-3 including the user serial interface 51-3 and the user parallel interface 52-3 have the same function as the first serial/parallel interface circuit 50-1 including the first serial interface 51-1 and the first parallel interface 52-1 in the program estimation device 91-1, respectively.

The user built-in RAM 30-3, the user peripheral circuit 7-3, the user on-board write interface 8-3 and the user internal bus monitoring RAM 40-3 in the user system estimation device 91-3 have the same function as the first built-in RAM 30-1, the first peripheral circuit 7-1, the first on-board write interface 8-1 and the first internal bus monitoring RAM 40-1 in the program estimation device 91-1, respectively.

Explanation will be given in further detail. In FIG. 8, the terminals that function as the interface with the ICE board (here, the terminals of the first serial interface 51-1 in the program estimation device 91-1) are left after the product obtained by mounting the estimation device, such as the flash microcontroller, to the user target board is shipped as the product. When any fault develops in the product after shipment, this arrangement makes it possible to estimate once again the user program and the user target board 99 by connecting the terminals of the first serial interface 51-1 to the, terminals of the user serial interface 51-3 and supplying the signals Sse from the program estimation device 91-1 to the user target board 99. Basically, when a ROM capable of rewriting the data (such as the user ROM 10-3) is used, estimation of the user program and the user target board can be made as many times as desired.

Figure 9:
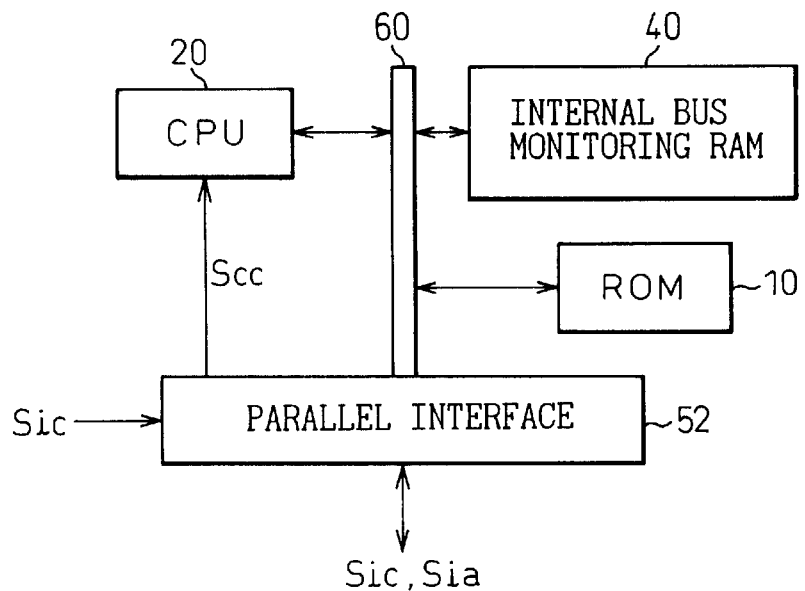
FIG. 9 is a block diagram showing the relationship between a parallel interface used in the embodiments of the present invention and other constituent elements.

FIG. 9 is a block diagram showing the relationship between the parallel interface and other constituent elements that are used in the embodiment of the present invention. However, the drawing shows the relationship between the parallel interface and other constituent elements that are used in the first preferred embodiment shown in FIG. 5.

The signals of the parallel form that are supplied from the external ICE 90 (FIG. 5) to the parallel interface 52 in the estimation device contain the address/data signals Sia relating to the program, various control signals and the input signal for program debugging, as shown in FIG. 9. Here, the parallel interface 52 processes the signals of the parallel form from the external ICE 90, takes out the control signal Scc for the CPU and sends it to the CPU 20 without passing it through the address data bus 60.

The control signal Scc for the CPU is preferably transferred to, and processed appropriately by, the peripheral circuit 7 (FIG. 5) having the peripheral function for controlling the operation of the CPU 20, and is then supplied to the CPU 20. Depending on the types, however, the estimation device is not equipped with the peripheral circuit for processing the signals of the parallel form sent from the parallel interface 52. In such a case, all of the signals supplied from the external ICE 90 are the signals of the serial form, and these signals of the serial form are transferred through the serial interface 51 (FIG. 5).

On the other hand, the data written into the internal bus monitoring RAM 40 as a result of the tracing operation of the address data bus 60 at the time when the program for program debugging or the program for system estimation is operated is sent to the external through the terminals connected to the parallel interface 52. In other words, program debugging and the user-generated system estimation can be executed efficiently as the data inside the internal bus monitoring RAM is read out from the parallel interface 52.

The signals other than the control signal Scc that are supplied from the external ICE are transferred from the parallel interface 52 to the serial interface 51, are converted to the signals of the serial form and are then transferred to the CPU 20 and the rewritable ROM 10.

Figure 10:
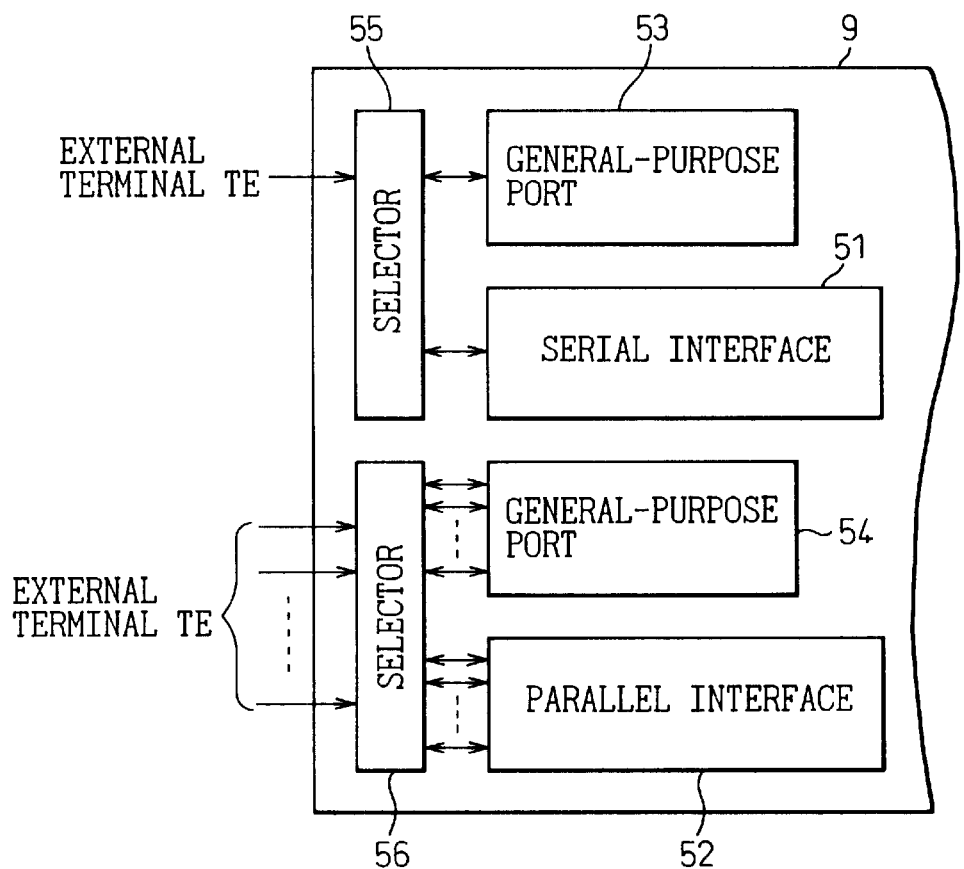
FIG. 10 is a block diagram showing the construction in which the terminals of a serial/parallel interface used in the embodiments of the present invention are used also as the terminals of a general-purpose port.

FIG. 10 is a block diagram showing the construction in which the terminals of the serial/parallel interface used in this embodiment are used also as the terminals of the general-purpose ports. However, this drawing shows the construction of the terminals of the serial/parallel interface used in the first preferred embodiment shown in FIG. 5.

In FIG. 10, the terminals of the serial interface 51 and the parallel interface 52 in the serial/parallel interface circuit 50 handle also the signals used for the general-purpose ports 53 and 54.

In FIG. 10, a selector 55 for selecting the combined-use terminals selectively switches and connects the terminals of the serial interface 51 and the terminals handling the signals used for the general-purpose port 53 with respect to the external terminal TE of the estimation device 9. Similarly, a selector 56 for selecting the combined-use terminals selectively switches and connects the terminals of the parallel interface 52 and the terminals handling the signals used for the general-purpose port 54 with respect to the external terminal TE of the estimation device 9.

According to this construction, the serial/parallel interface circuit can be used as the general-purpose ports when it is not used as the serial interface and the parallel interface. Therefore, the interface circuit in the device can be effectively utilized when the device is used as the discrete device without establishing the interface between the estimation device and the ICE. Incidentally, the input/output terminals of the peripheral circuit and the terminals of each of the serial interface and the parallel interface can be used conjointly, in place of the terminals that handle the signals used for the general-purpose ports 53 and 54.

In FIG. 10, the terminals can be switched to the terminals that handle the signals used for the general-purpose ports or to the input/output terminals of the peripheral circuit, by operating the selector in accordance with the switch control signals from the external, during the period in which both the serial interface and the parallel interface are used.

Figure 11:
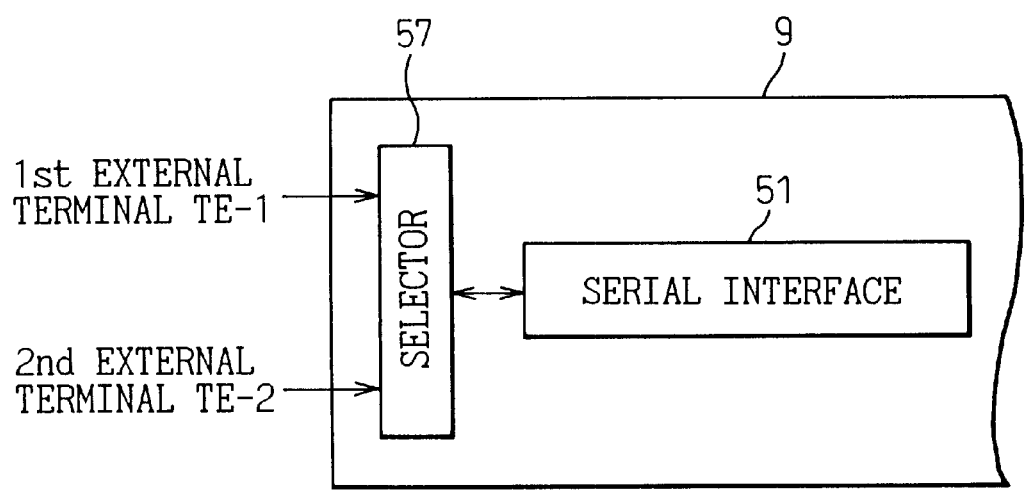
FIG. 11 is a block diagram showing the construction in which the terminals of a serial interface used in the embodiments of the present invention are switchable.

FIG. 11 is a block diagram showing the construction in which the terminals of the serial interface used for the embodiments of the present invention can be changed over. However, this drawing, too, shows the construction of the terminals of the serial interface used for the first preferred embodiment, etc., of the present invention shown in FIG. 5.

In FIG. 11, a selector 57 for switching a plurality of terminals is shown disposed separately from the selector for selecting the combined-use terminals described above. When this selector 57 is operated, the terminals of the serial interface 51 are switched to the positions of a plurality of external terminals of the estimation device (the first external terminal TE-1 and the second external terminal TE-2 shown in FIG. 11, for example). In other words, the positions of the terminals of the serial interface are not fixed in this case.

When user-generated system estimation is executed in this construction, the program is written into the built-in ROM in the system estimation device on the system estimation board (that is, on the target board). When this program is operated on the system device as a single device, the positions of the terminals of serial interface for transferring the information on monitoring of the internal bus are switched by operating the selector, and estimation of the system estimation board can be made for all the terminals.

Figure 12:
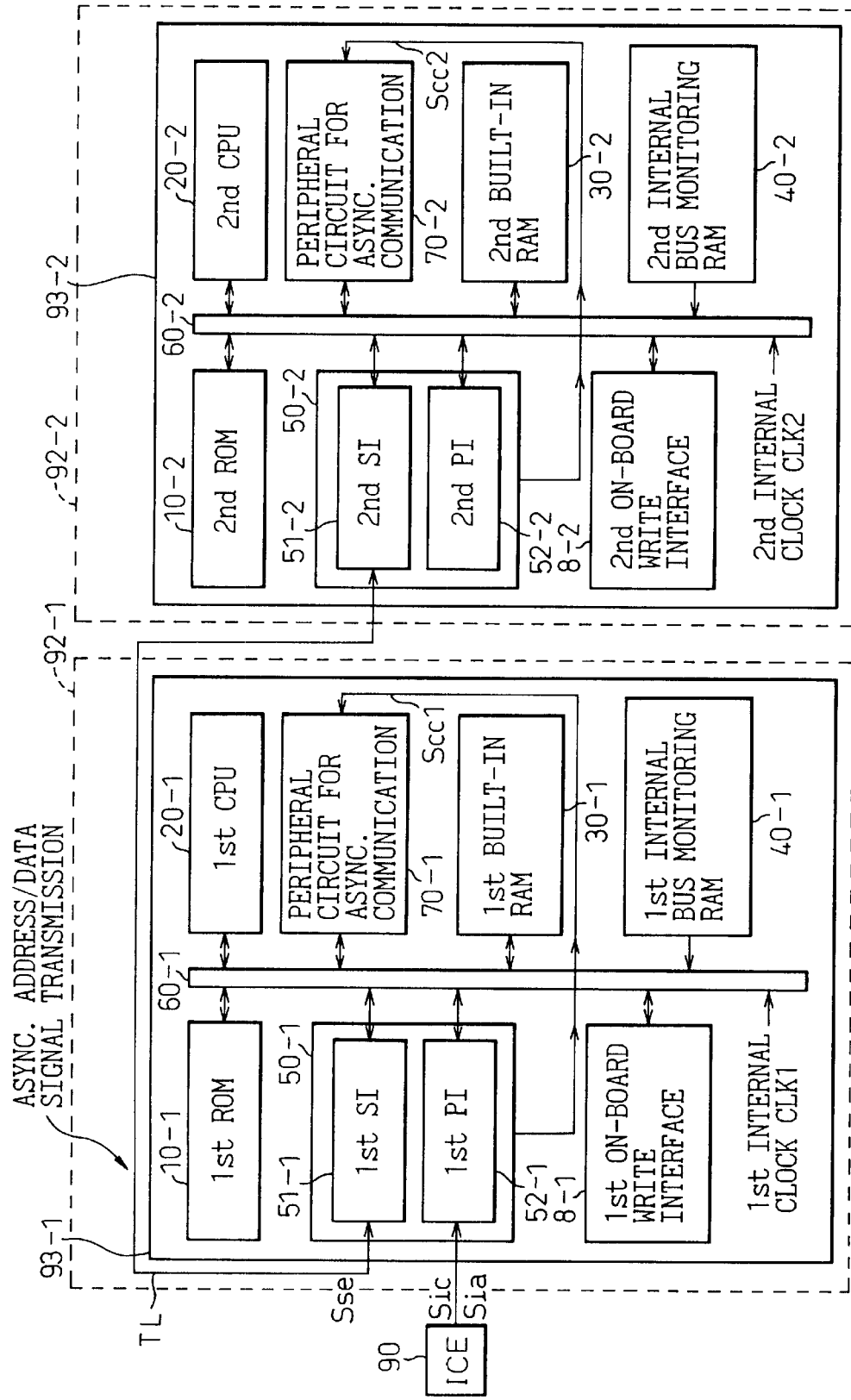
FIG. 12 is a block diagram showing the construction of the third preferred embodiment of the present invention.

FIG. 12 is a block diagram showing the construction of the third preferred embodiment of the present invention. The drawing shows the second concrete example of the estimation apparatus of the microcontroller according to the basic embodiment based on the second principle shown in FIG. 4.

In the second preferred embodiment (FIG. 6) described above, the program estimation device 91-1 is provided with the first peripheral circuit 7-1 for processing the signals in the clock synchronization system. The system estimation device 91-2 is provided with the second peripheral circuit 7-2 for processing the signals in the clock synchronization system. In other words, in the second preferred embodiment, both the program estimation device 91-1 and the system estimation device 91-2 have the built-in peripheral circuits for synchronous communication, each operating on a common clock. In such a construction, the signal transfer is executed between the program estimation device 91-1 and the system estimation device 91-2 through a two-line serial signal transfer lines TL for transferring the address/data signals and the common clock.

In contrast, in the third preferred embodiment of the present invention shown in FIG. 1.2, the program estimation device 93-1 is provided with a peripheral circuit 70-1 for asynchronous communication and the system estimation device 93-2 is provided with a peripheral circuit 70-2 for asynchronous communication. In other words, in this third preferred embodiment, each of the program estimation device 93-1 and the system estimation device 93-2 incorporates only the asynchronous communication peripheral circuit for processing the signals in the asynchronous system, unlike the second preferred embodiment described above. A typical example of such an asynchronous communication peripheral circuit is a UART (Universal Asynchronous Receiver-Transmitter).

The constituent elements other than the peripheral circuits in both the estimation device and the system estimation device are the same as those of the second preferred embodiment shown in FIG. 6. Therefore, detailed explanation of such constituent elements is hereby omitted.

In the third preferred embodiment described above, various constituent elements, inclusive of the asynchronous communication peripheral circuit 70-1, inside the program estimation device 93-1 operate on the basis of the first internal clock CLK1. On the other hand, various constituent elements, inclusive of the asynchronous communication peripheral circuit 70-2, inside the system estimation device 93-2 operate on the basis of the second internal clock CLK2. In this case, the signal Sse is transferred in the asynchronous system between the program estimation device 93-1 and the system estimation device 93-2 through the serial signal transfer lines TL for transferring the address/data signals. In consequence, program debugging and user-generated system estimation can be easily executed using the two estimation devices in the same way as in the second preferred embodiment.

Figure 13:
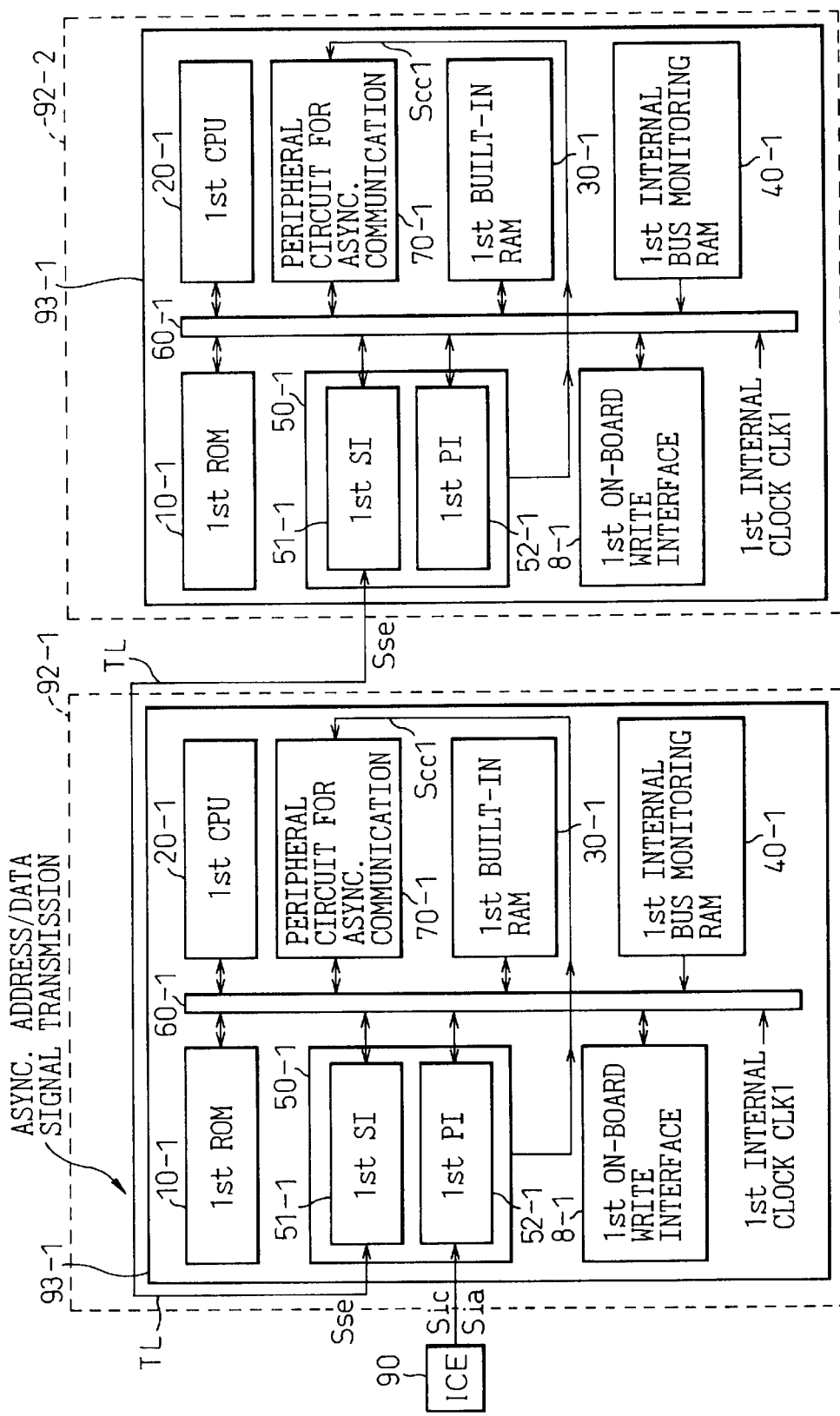
FIG. 13 is a block diagram showing an improved form of the embodiment shown in FIG. 12.
Figure 14:
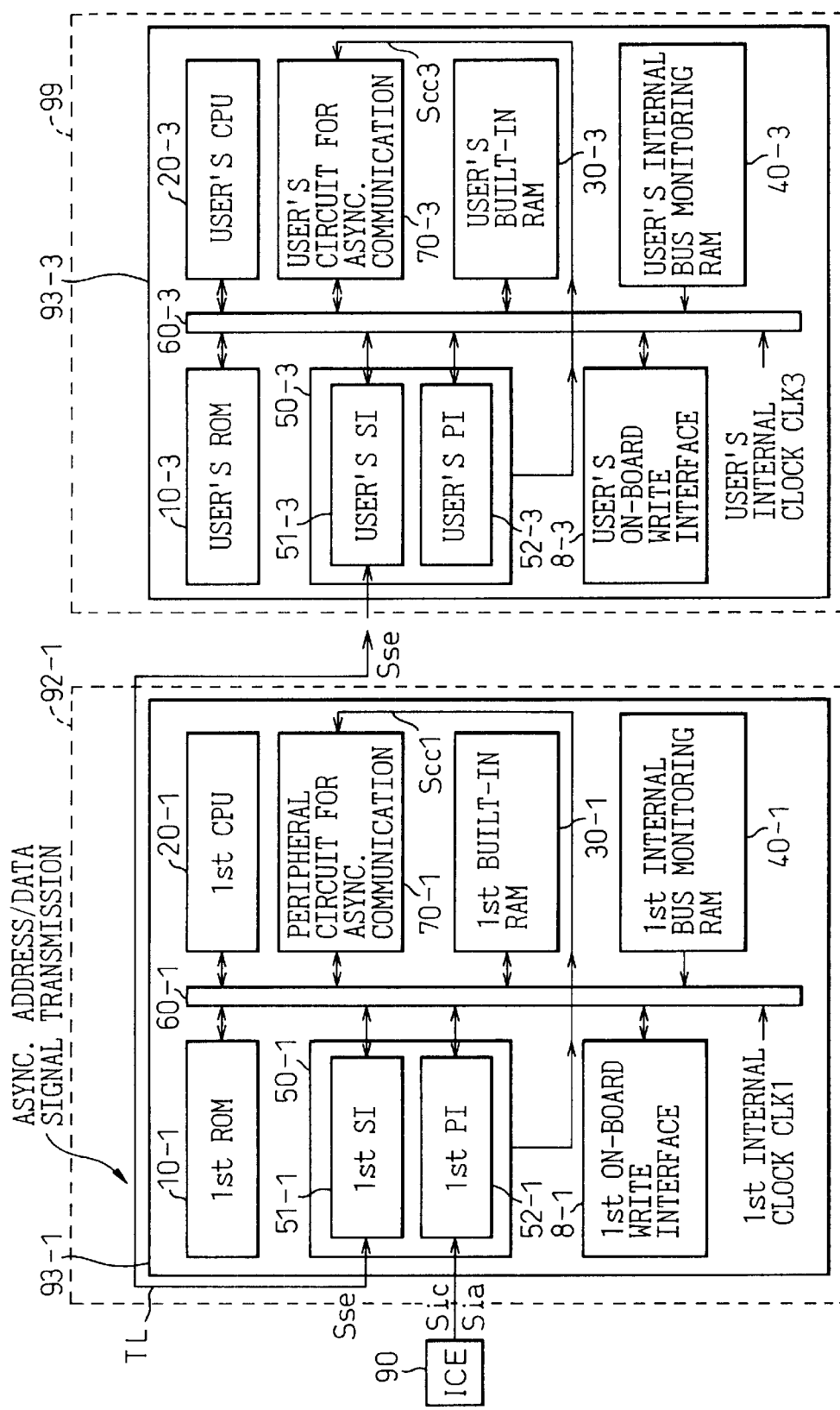
FIG. 14 is a block diagram showing the construction for executing re-estimation of a device after it is mounted to a system estimation board, by the use of the program evaluation device shown in FIG. 13.

FIG. 13 is a block diagram showing an improved form of the second embodiment shown in FIG. 12. FIG. 14 is a block diagram showing the construction for executing re-estimation of the device after being mounted to the system estimation board, by using the program estimation device shown in FIG. 13. Here, the improved form of the estimation apparatus of the microcontroller according to the third preferred embodiment shown in FIG. 12 is illustrated in the drawings.

In FIG. 13, the two estimation devices are accomplished by the same chip by fabricating the two estimation devices (the program estimation device 93-1 and the system estimation device 93-2) shown in FIG. 12 in the same fabrication process. In FIG. 13, the program estimation device 93-1 used for program debugging is mounted onto the program estimation board 92-1 while being connected to the external ICE, and the program estimation device used also for user-generated system estimation is mounted to the system estimation board 92-2.

In other words, the estimation apparatus of the microcontroller shown in FIG. 13 is different from the aforementioned embodiment shown in FIG. 12 in that the system estimation device (that is, the program estimation device) fabricated in the same fabrication process as the program estimation device for program debugging is used also for user-generated system estimation. It is to be noted that the operations for executing program debugging and user-generated system estimation using such a program estimation device 93-1 (hereby called the "estimation device") is substantially the same as the operation of the embodiment shown in FIG. 12.

In the estimation apparatus of the microcontroller shown in FIG. 13, each of the two estimation devices (that is, the program estimation devices 93-1) is equipped with the asynchronous communication peripheral circuit 70-1. In other words, the estimation apparatus of the microcontroller shown in FIG. 13, too, has the asynchronous communication peripheral circuits for processing the signals in the asynchronous system inside the estimation devices, in the same way as the third preferred embodiment. A typical example of such an asynchronous communication peripheral circuit is a UART.

The constituent elements other than the asynchronous communication peripheral circuit in each of the two estimation devices are the same as those of the aforementioned second and third preferred embodiments. Therefore, a detailed explanation of such constituent elements is hereby omitted.

In the estimation apparatus of the microcontroller shown in FIG. 13, various constituent elements in each of the two estimation devices, inclusive of the asynchronous communication peripheral circuit 70-1, operate on the basis of the first internal clock CLK1. In this case, signal transfer is executed in the asynchronous system between the two estimation devices (that is, the program estimation devices 93-1) through the serial signal transfer lines TL for transferring the address/data signals. In consequence, program debugging and user-generated system estimation can be executed easily by using only one kind of the estimation devices in the same way as in the estimation apparatus shown in FIG. 7.

Explanation will be given in further detail. When program debugging on the ICE side is executed in the estimation apparatus comprising one kind of estimation devices described above, the estimation apparatus is set to the tool mode using the external terminals. Thereafter, the external ICE 90 and the program estimation device 93-1 are connected through the first serial/parallel interface circuit 50-1. The two program estimation devices 93-1 are then connected to each other through the two first serial/parallel interface circuits 50-1. In this way, the program for program estimation is written into the first ROM 10-1 through the serial/parallel interface circuit 50-1 of the other estimation device or through the first on-board write interface 8-1 in the same way as in the aforementioned estimation apparatus shown in FIG. 7. The first CPU 20-1 of the other estimation device serially reads the program stored in the first ROM 10-1 and operates the microcontroller.

Thereafter, when the content of the data held in the first internal bus monitoring RAM 40-1, or the content of the data held in the first ROM 10-1, or the content of the data sent to the external ICE 90 is read out using the first serial interface 51-1 in one of the estimation devices in the same way as in the aforementioned estimation apparatus shown in FIG. 7, program debugging of the microcontroller can be executed easily while the estimation device is mounted to the board for user-generated system estimation.

On the other hand, when user-generated system estimation after program debugging is executed in the estimation apparatus comprising the two estimation devices formed of the same chip described above, the estimation apparatus is set to the normal operation mode by using the external terminals, in the same way as in the aforementioned estimation apparatus shown in FIG. 7. The external ICE 90 and one of the estimation devices are cut off from the other estimation device in the same way as in the aforementioned estimation apparatus shown in FIG. 7, and the program for system estimation is written into the first ROM 10-1 in the form in which the other estimation device is mounted to the system estimation board 92-2.

The content of the data held in the first ROM 10-1 of the estimation device mounted to the system estimation board 92-2 is read out, and system debugging in the normal operation mode is executed. In consequence, user-generated system estimation can be executed easily by using the estimation device. In this case, too, user-generated system estimation can be executed efficiently by causing the first ROM 10-1 in the other estimation device to function as the mask ROM, in the same environment as when the mass-produced devices are mounted to the board of the system, in the same way as in the estimation apparatus shown in FIG. 7.

Speaking more concretely, when the microcontroller is operated discretely on the target for user-generated system estimation, the program for system estimation is written into the flash microcontroller and this flash microcontroller is operated as the estimation device. In this case, too, the program for system estimation is read out by using the parallel interface inside the flash microcontroller. In this way, the microcontroller can be operated without connecting the ICE and the ICE board to the serial/parallel interface circuit.

When the estimation device such as the flash microcontroller is confirmed as not operating normally after it is shipped as the product, re-estimation of the program and the user target board can be executed easily while the estimation device is mounted to the user target board 99 shown in FIG. 14. Incidentally, in order to clearly distinguish the estimation device after shipment as the product from the estimation device under the state in which it is mounted to the user target board, the estimation device under the state in which it is mounted to the user target board is hereby called the "estimation device 93-3 for user system estimation".

The estimation device 93-3 for user system estimation has quite naturally the same construction as the construction of the aforementioned program estimation device 93-1. Speaking more concretely, the user ROM 10-3 and the user CPU 20-3 in the estimation device 93-3 for user system estimation have the same function as the first ROM 10-1 and the first CPU 20-1 in the program estimation device 93-1, respectively. The user serial/parallel interface circuit 50-3 including the user serial interface 51-3 and the user parallel interface 52-3 has the same function as the first serial/parallel interface circuit 50-1 including the first serial interface 51-1 and the first parallel interface 52-1 inside the program estimation device 93-1.

The user built-in RAM 30-3, the user asynchronous communication peripheral circuit 70-3, the user on-board write interface 8-3 and the user internal bus monitoring RAM 40-3 in the estimation device 93-3 for user system estimation have the same function as the first built-in RAM 30-1, the asynchronous communication peripheral circuit 70-1, the first on-board write interface 8-1 and the first internal bus monitoring RAM 40-1 inside the program estimation device 93-1, respectively.

An explanation will be given in further detail below. In FIG. 14, the terminals functioning as the interface with the ICE board (here, the terminals of the first serial interface 51-1 in the program estimation device 93-1) are left after the product obtained by mounting the estimation device such as the flash microcontroller to the user target board is shipped as the product. This arrangement makes it possible to execute once again estimation of the user program and the user target board 99 by connecting the terminals of the first serial interface 51-1 to the terminals of the user serial interface 51-3 and supplying the signals from the program estimation device 93-1 to the user target board 99 when any fault occurs develops in the product after shipment.

As described above, FIGS. 7, 8, 13 and 14 illustrate the application examples of the construction of the estimation apparatus, in which the system estimation device fabricated in the same fabrication process as the program estimation device is used as the estimation device for user system estimation, to the second and third preferred embodiments. It should be noted, however, that such a construction can also be applied to the later-appearing fourth to seventh preferred embodiments.

Figure 15:
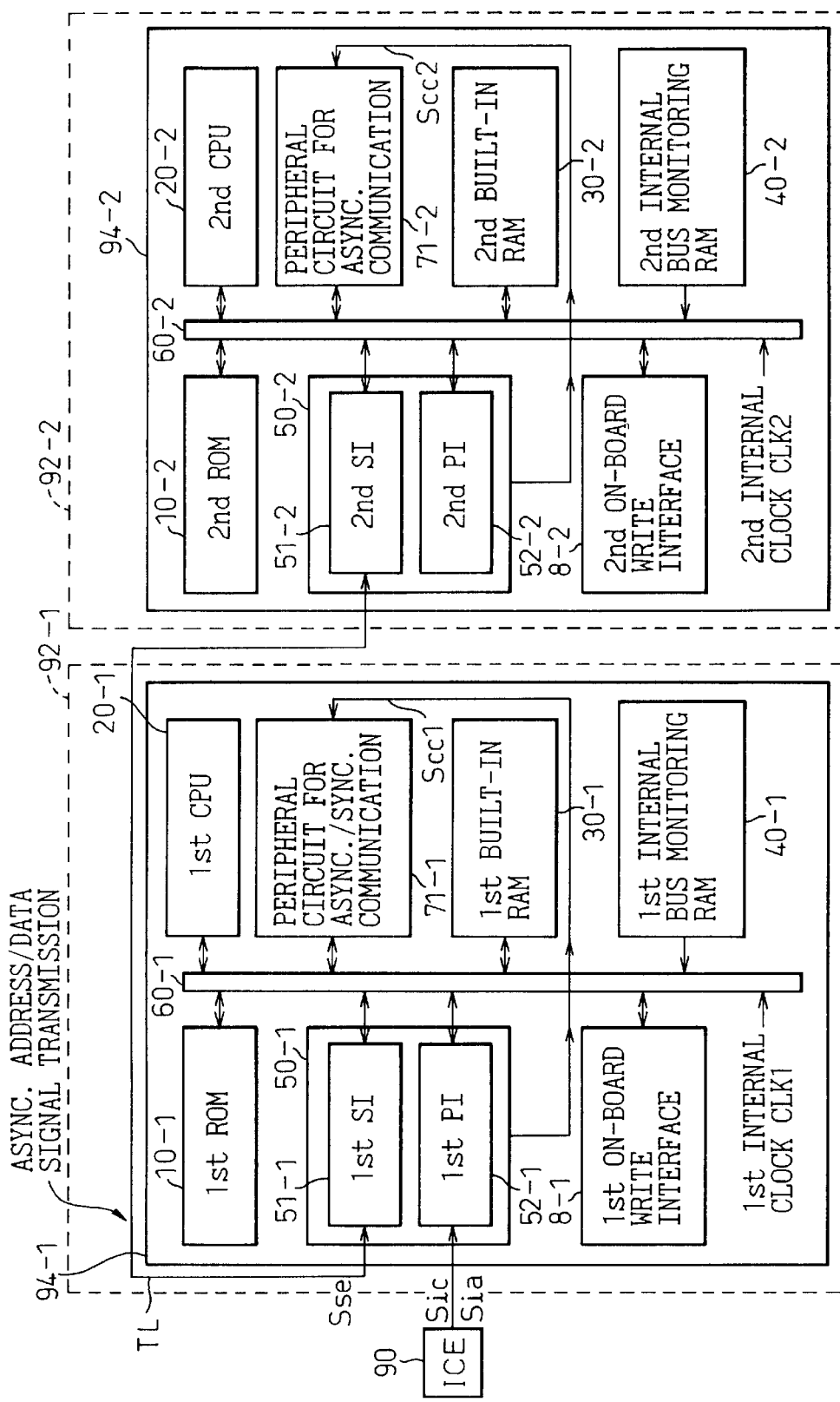
FIG. 15 is a block diagram showing the construction of the fourth preferred embodiment of the present invention.

FIG. 15 is a block diagram showing the construction of the fourth preferred embodiment of the present invention. The drawing shows the third concrete example of the estimation apparatus of the microcontroller according to the basic embodiment based on the second principle shown in FIG. 4.

In the fourth preferred embodiment of the present invention shown in FIG. 15, a program estimation device 94-1 is furnished with a peripheral circuit 71-1 for asynchronous/synchronous (sometimes abbreviated as "async/sync") communication, and a system estimation device 94-2 is furnished with a peripheral circuit 71-2 for async/sync communication. In other words, unlike the second and third preferred embodiments (and their improved forms) described above, the fourth preferred embodiment constitutes an estimation apparatus of a microcontroller according to the present invention by using the program estimation device 94-1 having the built-in async/sync communication peripheral circuit 71-1 for processing the signals in the asynchronous system or in the clock synchronization system and the system estimation device 94-2 having the built-in async communication peripheral circuit 71-2 for processing the signals in the asynchronous system.

The circuit elements other than the peripheral circuit in each of the estimation device and the system estimation device are the same as those of the second preferred embodiment shown in FIG. 6. Therefore, a detailed explanation of such constituent elements is hereby omitted.

In the third preferred embodiment described above, various constituent elements, inclusive of the async/sync communication peripheral circuit 71-1, in the program estimation device 94-1 operate on the basis of-the first internal clock CLK1. On the other hand, various constituent elements, inclusive of the async/sync communication peripheral device 94-2, inside the system estimation device 94-2 operate on the basis of the second internal clock CLK2 different from the first internal clock CLK1. In this case, too, the signal Sse is transferred between the program estimation device 94-1 and the system estimation device 94-2 through the serial signal transfer lines TL for transferring the address/data signals, in the same way as in the third embodiment described above. In consequence, program debugging and user-generated system estimation can be executed easily by using the two estimation devices in the same way as in the second and third embodiments described above.

Incidentally, in the fourth preferred embodiment described above, the program estimation device is provided with the async/sync communication peripheral circuit and the system estimation device, with the asynchronous communication peripheral circuit. However, the signals can also be transferred in the asynchronous system between the two estimation devices in the construction in which the program estimation device is provided with the asynchronous communication peripheral circuit and the system estimation device, with the async/sync peripheral circuit. Therefore, program debugging and user-generated system estimation can be executed easily using the two estimation devices.

Figure 16:
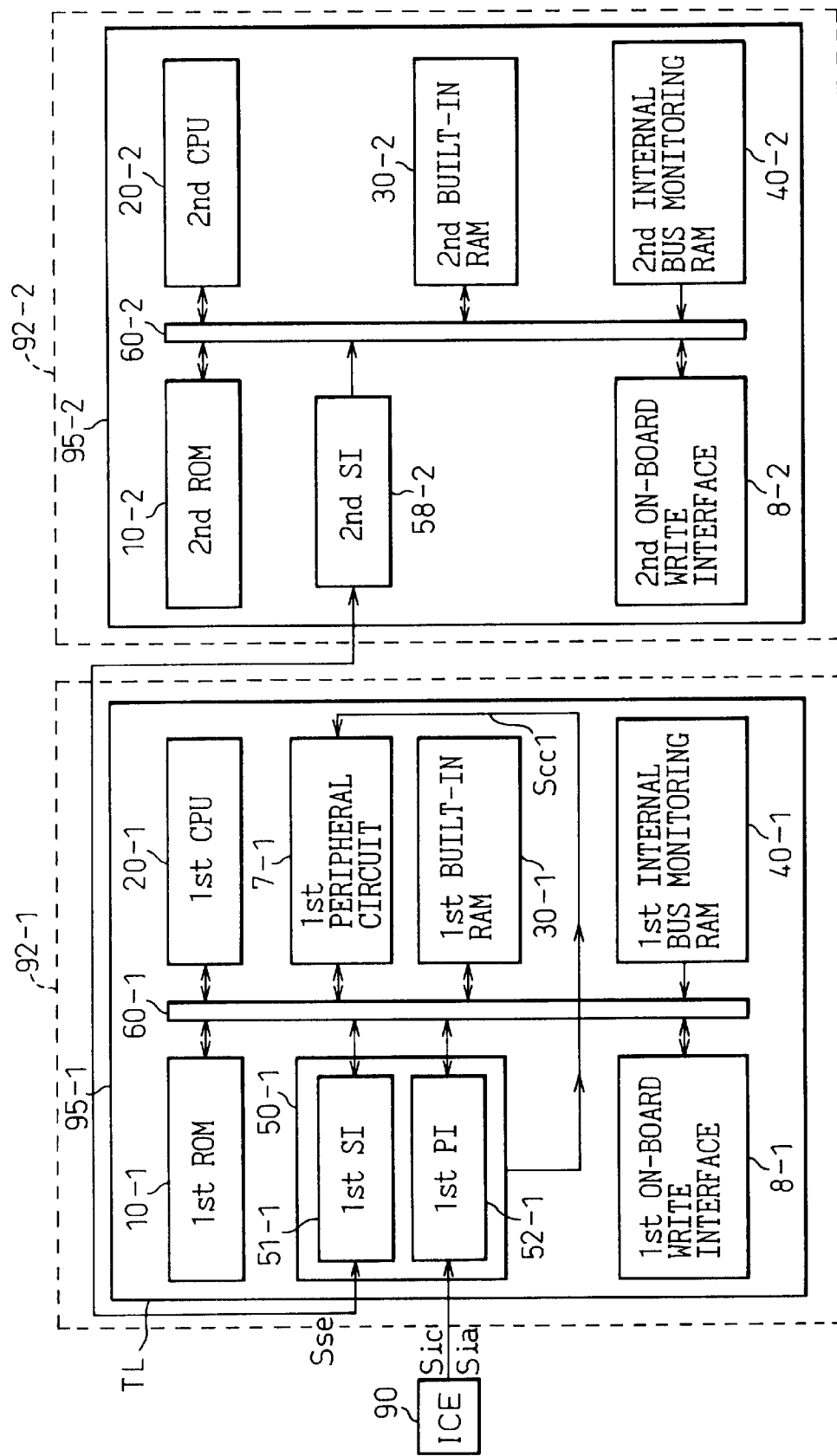
FIG. 16 is a block diagram showing the construction of the fifth preferred embodiment of the present invention.

FIG. 16 is a block diagram showing the construction of the fifth preferred embodiment of the present invention. The drawing shows the fourth concrete example of the estimation apparatus of the microcontroller according to the basic embodiment based on the second principle shown in FIG. 4.

In the fifth preferred embodiment of the present invention shown in FIG. 16, a program estimation device 95-1 is furnished with a peripheral circuit (a first peripheral circuit 7-1 of the clock synchronization type similar to the circuit shown in FIG. 6, for example) for processing the signals of the parallel form (such as the first control signals Scc1) sent from the first parallel interface. However, a system estimation device 95-2 is not furnished with a peripheral circuit for processing the signals of the parallel form. In this case, a parallel interface for sending the signals of the parallel form to the peripheral circuit is not, quite naturally, provided to the system estimation device 95-2. In other words, unlike the second preferred embodiment already described, the fifth preferred embodiment constitutes the estimation apparatus of the microcontroller according to the present invention by using the program estimation device 95-1 having the built-in first peripheral circuit 7-1 of the clock synchronization system and the system estimation device 95-2 not having the built-in peripheral circuit.

Constituent elements other than the peripheral circuit and the serial/parallel interface circuit in the program estimation device and other than the system estimation device are the same as those of the second embodiment shown in FIG. 6. Therefore, a detailed explanation of such constituent elements is hereby omitted.

In the fifth preferred embodiment described above, the signals of the parallel form supplied from the external ICE are processed by the first parallel interface 52-1 and are sent to the first peripheral circuit 7-1. In contrast, the signals Sse sent to the system estimation device 95-2 through the first serial interface 51-1 and through the serial signal transfer lines TL are all processed by the second serial interface 58-2. In this way, even when the system estimation device is not equipped with the built-in peripheral circuit, the signals of the parallel form supplied from outside can be transferred without error to the system estimation device.

In the fifth preferred embodiment, even when the peripheral circuit and the parallel interface for processing the signal is of the parallel form are not incorporated in the system estimation device, the serial interface can alone process the signals in the system estimation device. In consequence, program debugging and user-generated system estimation can be executed easily by using the two estimation devices in the same way as in the second to fourth preferred embodiments and their improved forms.

Figure 17:
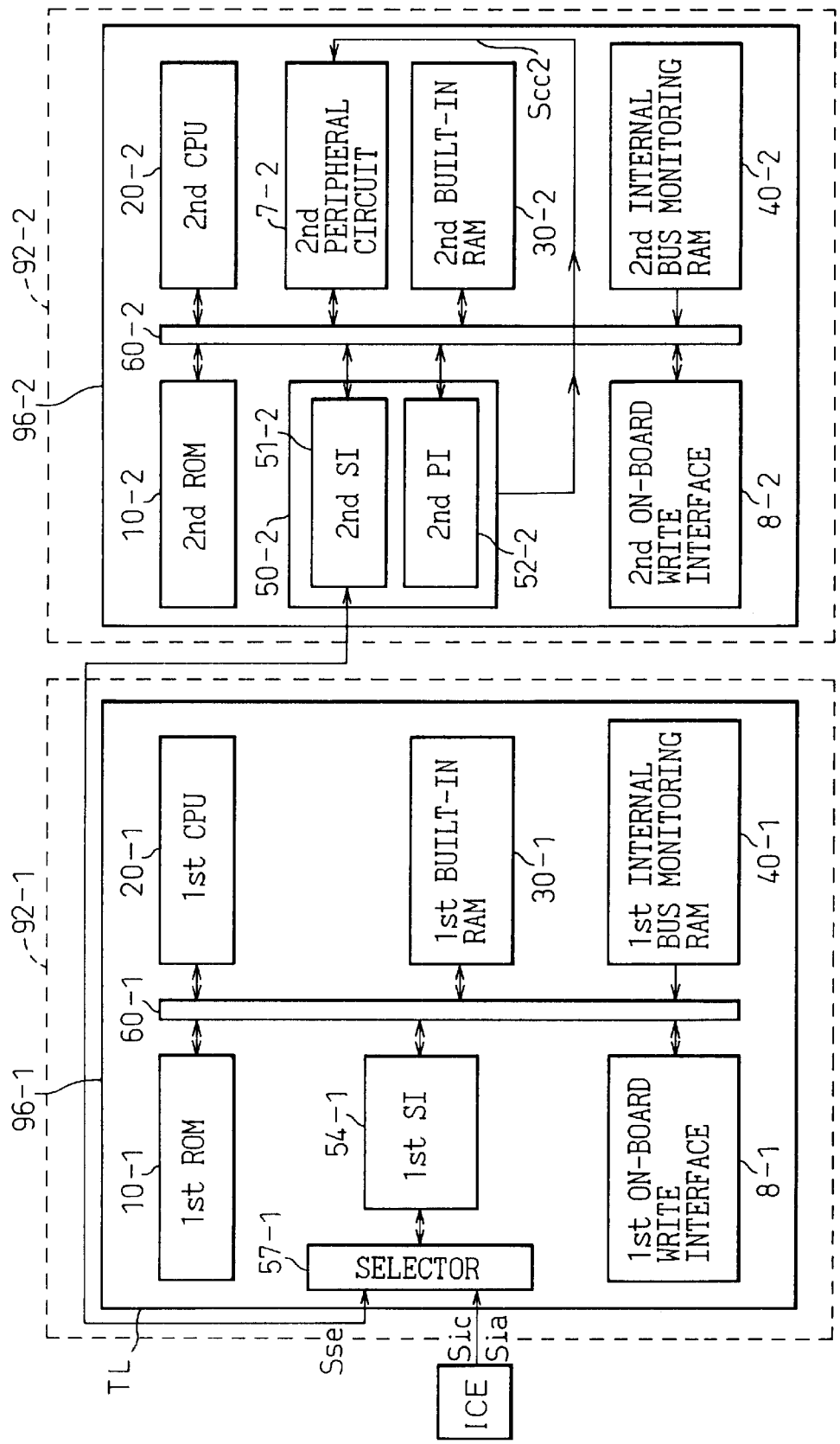
FIG. 17 is a block diagram showing the construction of the sixth preferred embodiment of the present invention.

FIG. 17 is a block diagram showing the construction of the sixth preferred embodiment of the present invention. The drawing shows the fifth concrete example of the estimation apparatus of the microcontroller according to the basic embodiment based on the second principle shown in FIG. 4.

In the sixth preferred embodiment of the present invention shown in FIG. 17, a system estimation device 96-2 is furnished with a peripheral circuit (such as the second peripheral circuit 7-2 of the clock synchronization system shown in FIG. 6) for processing the signals of the parallel form (such as the second control signal Scc2) sent from a second parallel interface 52-2. However, a program estimation device 96-1 is not equipped with a peripheral circuit for processing signals of the parallel form. Quite naturally, the program estimation device 96-1 is not provided with a parallel interface for sending the signals of the parallel form to the peripheral circuit, either, in this case. In other words, unlike the second preferred embodiment shown in FIG. 6, the sixth preferred embodiment constitutes the estimation apparatus of the microcontroller according to the present invention by using the program estimation device 96-1 not equipped with the built-in peripheral circuit in combination with the program estimation device 96-2 having the second built-in peripheral circuit 7-2 of the clock synchronization system.

In this case, however, the apparatus is equipped with a selector 57-1 in order to switch the terminal for receiving the signals supplied from the external ICE 90 and the terminal for receiving the signals Sse sent to the second serial interface 51-2 in the program estimation device 96-1. This selector 57-1 has substantially the same function as that of the selector 57-1 that has been already explained with reference to FIG. 11.

Constituent elements other than the peripheral circuit, the serial/parallel interface circuit and the selector in both program estimation device and system estimation device are the same as those of the second preferred embodiment shown in FIG. 6. Therefore, a detailed explanation of such constituent elements is hereby omitted.

In the sixth preferred embodiment described above, the signals supplied from the external ICE 90 are all processed by the first serial interface 59-1. The signals Sse processed by this first serial interface 59-1 are transferred to the system estimation device 96-2 through the serial signal transfer lines TL after the terminal switching operation is made by the selector 57-1. The signals Sse transferred to the system estimation device 96-2 are processed by the second parallel interface 52-2 and are then sent to the second peripheral circuit 7-2. The second peripheral circuit 7-2 processes the signals of the parallel form in the same way as in the second preferred embodiment already described. In this way, even when the construction does not include the peripheral circuit built in the program estimation device, the signals of the serial form can be transferred to the system estimation device without error by using the signals of the serial form.

Even when the peripheral circuit and the parallel interface for processing the signals of the parallel form are not built in the program estimation device in the sixth preferred embodiment, the signals in the program estimation device can be processed by appropriately utilizing the serial interfaces in combination with the selector for switching the terminals. In consequence, program debugging and user-generated system estimation can be executed easily by using the two estimation devices in the same way as in the 'second to fifth preferred embodiments and their improved forms.

Figure 18:
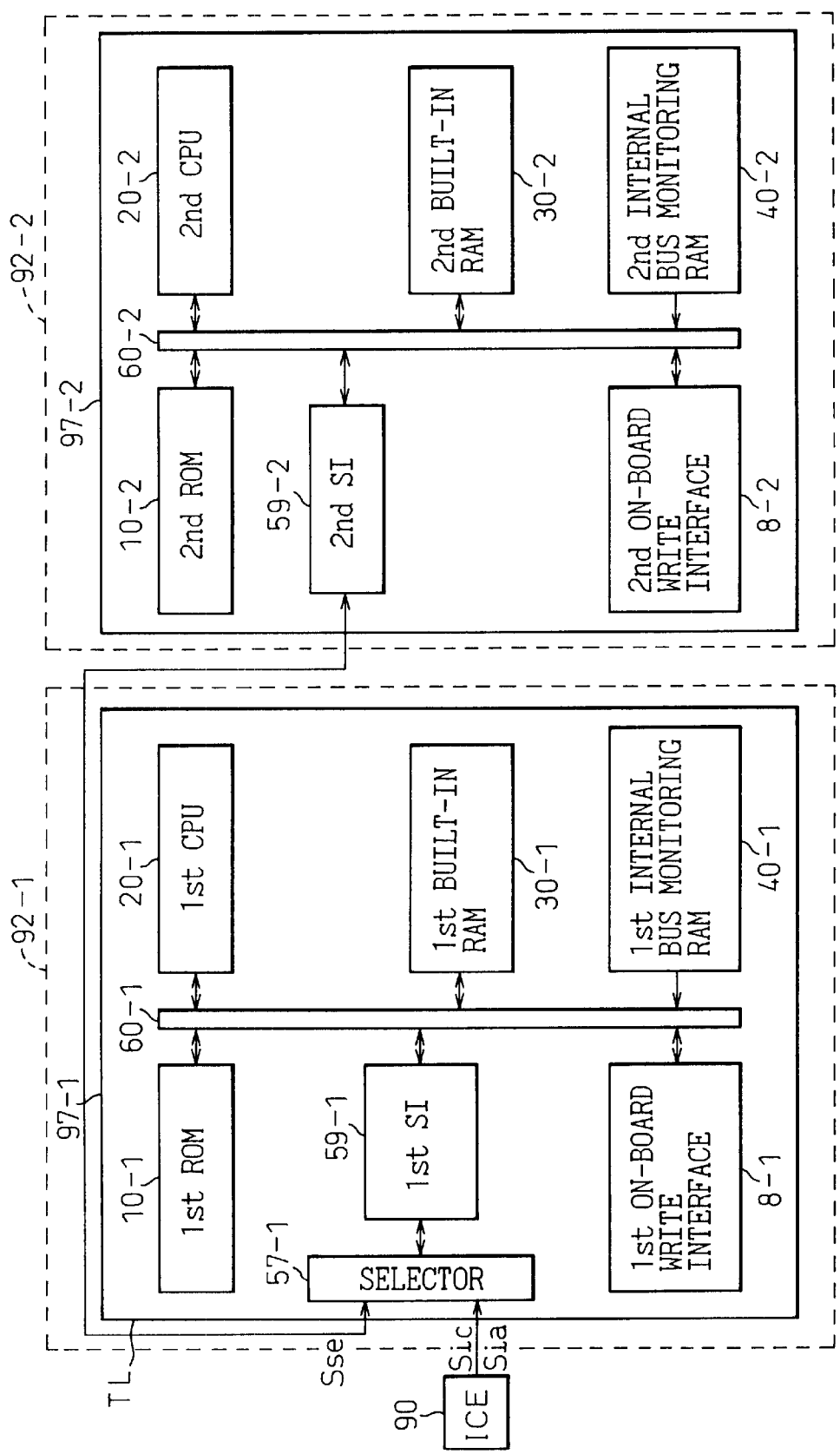
FIG. 18 is a block diagram showing the construction of the seventh preferred embodiment of the present invention.

FIG. 18 is a block diagram showing the construction of the seventh preferred embodiment of the present invention. The drawing shows the sixth concrete example of the estimation apparatus of the microcontroller according to the basic embodiment based on the second principle shown in FIG. 4.

In the seventh preferred embodiment of the present invention shown in FIG. 18, both of the program estimation device 97-1 and the system estimation program 97-2 are not provided with a peripheral circuit for processing the signals of the parallel form. Quite naturally, both of the program estimation device 97-1 and the system estimation device 97-2 are not provided, in this case, with a parallel interface for sending the signals of the parallel form to the peripheral circuit. In other words, unlike the second preferred embodiment shown in FIG. 6, the seventh preferred embodiment constitutes the estimation apparatus of the microcontroller according to the present invention by using the program estimation device 97-1 and the program estimation device 96-2 that are not provided with the built-in peripheral circuit.

In this case, however, the estimation apparatus is equipped with a selector 57-1 for switching a plurality of terminals. This selector 57-1 switches the terminal that receives the signals supplied from the external ICE 90 and the terminals that receive the signals Sse sent to the second serial interface 59-2 in the program estimation device 97-1. This selector 57-1 has substantially the same function as that of the selector 57 explained with reference to FIG. 11.

Constituent elements other than the peripheral circuits, the serial/parallel interface circuits and the selector in the program estimation device and the system estimation device are the same as those of the second preferred embodiment shown in FIG. 6. Therefore, a detailed explanation of such constituent elements is omitted.

In the seventh preferred embodiment, the signals supplied from the external ICE 90 are all processed by the first serial interface 59-1. The signals Sse processed by this first serial interface 59-1 are transferred to the system estimation device 97-2 through the serial signal transfer lines TL after the selector 57-1 executes the terminal switching operation.

The signals Sse transferred to the system estimation device 97-2 are all processed by the second serial interface 59-2. In this way, even when the program estimation device and the system estimation device do not include the built-in peripheral circuit, the signals of the serial form can be transferred to the system estimation device without error by using the signals of the serial form as the signals that are supplied from the external and as the signals processed in the two estimation devices.

In the seventh preferred embodiment described above, all the signals can be processed by utilizing appropriately the serial interfaces in combination with the terminal switching selector, although the program estimation device and the system estimation device are not equipped with the peripheral circuit and with the parallel interface for processing the signals of the parallel form. In consequence, program debugging and user-generated system estimation can be executed easily by using the two estimation devices in the same way as in the second to sixth preferred embodiments and their improved forms.

The first to seventh preferred embodiments and their improved forms that have thus been described can easily execute program debugging and user-generated system estimation in the form in which the program estimation device and the system device are mounted onto the board of the user-generated system. For this reason, the program estimation device and the system estimation device need not be developed separately, and they can be developed efficiently with a short period of time. In this case, the development of both the program estimation device and system estimation device can be accomplished by developing only one kind of the devices. Accordingly, the user can execute timely system design, and TAT for the system development can be reduced.

According to the first to seventh preferred embodiments and their improved forms of the present invention, program estimation and user-generated system estimation can be executed easily and efficiency in the same environment as when the mass-produced devices are mounted to the target board. Therefore, the shift from the program development and the system development to the mass production of the devices can be done easily.

If the user makes any claim against the products after the mass-produced devices are shipped as the products, the first to seventh preferred embodiments and their improved forms of the present invention make it possible to easily analyze the defective positions on the basis of the information of the internal bus monitoring RAM by using the estimation device developed by the system of the present invention.

Incidentally, the concrete construction of the estimation apparatus of the microcontroller according to the present invention is not particularly limited to the first to seventh preferred embodiments and their improved forms, and various other modifications can be made. For example, the estimation apparatus comprising the combination of the estimation device equipped with the asynchronous communication peripheral circuit, that is described in the third and fourth preferred embodiments, with the estimation device not having the peripheral circuit, that is described in the fifth to seventh embodiments, is also a preferred embodiment of the present invention.

As explained above, the estimation apparatus of the microcontroller and the estimation thereof according to several typical embodiments of the present invention provide the following advantages. In the first place, the program estimation device and the system estimation device need not be developed separately because the internal bus monitoring unit for monitoring the state of the internal bus while the one-chip microcontroller is operated is incorporated in the estimation device, and program estimation and system estimation are executed by reading out the data written into this internal bus monitoring unit. In consequence, the program estimation device and the system estimation device can be developed within a short time by developing only one kind of the device (chip). Consequently, the user can make timely system design and TAT for the system development can be shortened.

In the second place, the estimation apparatus of the microcontroller and the estimation method thereof according to several typical embodiments of the present invention process the signals supplied from the external ICE by the parallel interface, and process the monitoring result of the internal bus by the serial interface. Therefore, program estimation and system estimation can be executed easily and efficiently, and the operation defect analysis can be made in the same environment as when the devices (chips) are mounted to the board of the system.

In the third place, the estimation apparatus of the microcontroller and the estimation method thereof according to several typical embodiments of the present invention use the terminals of the serial interface and the parallel interface also as the terminals of the general-purpose ports. Therefore, the external terminals of the devices can be utilized effectively, and program estimation and system estimation can be executed efficiently.

In the fourth place, the estimation apparatus of the microcontroller and the estimation thereof according to several typical embodiments of the present invention use the terminals of the serial and parallel interfaces also as the terminals that handle the input/output signals other than the signals for the general-purpose ports. Therefore, the external terminals of the devices can be utilized efficiently, and program estimation and system estimation can be executed efficiently.

In the fifth place, the estimation apparatus of the microcontroller and the estimation method thereof according to several typical embodiments of the present invention can switch the positions of the terminals of the serial interface. Therefore, system estimation of the target board can be executed easily and efficiently for all the terminals of the devices.

In the sixth place, the estimation apparatus of the microcontroller and the estimation method thereof according to several typical embodiments of the present invention are equipped with the peripheral circuits for processing the signals of the parallel form sent from the parallel interface. Therefore, the external terminals of the devices can be utilized efficiently, and program estimation and system estimation can be executed efficiently.

In the seventh place, the estimation apparatus of the microcontroller and the estimation method thereof according to several typical embodiments of the present invention can transfer the signals supplied from the external by appropriately utilizing the serial interfaces even when peripheral circuits for processing the signals of the parallel form sent from the parallel interface in the serial/parallel interface circuit are not provided. Therefore, the external terminals of the devices can be utilized efficiently, and program estimation and system estimation can be executed efficiently.

In the eighth place, in the estimation apparatus of the microcontroller and the estimation method thereof according to several typical embodiments of the present invention, the data holding unit in the estimation device comprises a rewritable flash ROM. Therefore, the monitoring result of the state of the internal bus can be written easily into the flash ROM, and the user can execute timely system design.

In the ninth place, the estimation apparatus of the microcontroller and the estimation method thereof according to several typical embodiments of the present invention can easily write the monitoring result of the state of the internal bus into the flash ROM by using the on-board write interface. Therefore, program development and system estimation can be executed within a short time.

In the tenth place, the estimation apparatus of the microcontroller and the estimation method thereof according to several typical embodiments of the present invention impart passwords to the internal bus monitoring RAM and the ROM, and can analyze the data written into the flash ROM by using such passwords. Therefore, the third party other than the program developer is prevented from reading out the content of the data written into the internal bus monitoring RAM and the ROM and from decoding the program.

In the eleventh place, the estimation apparatus of the microcontroller and the estimation method thereof according to several typical embodiments of the present invention include the two estimation devices having the same construction, and use one of them as the program estimation device dedicated to the ICE and the other, as the system estimation device. Therefore, the program estimation device and the system estimation device need not be developed separately, and both of them can be developed within a short time by developing only one kind of device (chip). In consequence, the TAT for the system development can be shortened.

In the twelfth place, when at least one of the program estimation device and the system estimation device has the built-in asynchronous communication peripheral circuit for processing the signals in the asynchronous system, the estimation apparatus of the microcontroller and the estimation method thereof according to several typical embodiments of the present invention can execute easily and efficiently program estimation and system estimation by transferring the signals through the serial interface.

What is claimed is:

1. An apparatus for estimating a microcontroller comprising, in one device:
   a data holding unit for holding arbitrary data rewritably;
   a processing unit for operating a microcontroller on the basis of a control signal, and processing said arbitrary data;
   an interface unit for external communication, for receiving signals supplied from an external device, taking out said control signal and sending it to said processing unit; and
   an internal bus monitoring unit for monitoring the state of an internal bus for connecting mutually said data holding unit, said processing unit and said interface unit for external communication;
   wherein said processing unit writes the state of said internal bus, at the time when said microcontroller is operated on the basis of said control signal, into said internal bus monitoring unit, and inputs said state written into said internal bus monitoring unit to said data holding unit, or sends it to the external device through said interface unit for external communication.

2. An apparatus according to claim 1, wherein said interface unit for external communication has a serial/parallel interface circuit containing a serial interface for processing signals of a serial form and a parallel interface for processing signals of a parallel form.

3. An apparatus according to claim 2, wherein terminals of each of said serial interface and said parallel interface inside said serial/parallel interface circuit are so constituted so as to be capable of also handling signals used for general-purpose ports.

4. An apparatus according to claim 2, wherein, when terminals of each of said serial interface and parallel interface in said interface serial/parallel interface circuit are constituted so as to function also as terminals for handling input/output signals other than signals used for general-purpose ports, said terminals of each of said serial interface and parallel interface can be switched to the terminals for handling the input/output signals other than the signals used for said general-purpose ports while said serial and parallel interfaces are used.

5. An apparatus according to claim 2, wherein the positions of terminals of said serial interface in said serial/parallel interface circuit are not fixed but can be switched to a plurality of positions.

6. An apparatus according to claim 2, which further comprises a peripheral circuit for processing signals of a parallel form sent from said parallel interface in said serial/parallel interface circuit.

7. An apparatus according to claim 2, wherein said estimation apparatus is not equipped with a peripheral circuit for processing signals of the parallel form sent from said parallel interface in said serial/parallel interface circuit, and the signals supplied from the external device are all transferred through said serial interface.

8. An apparatus according to claim 1, wherein said data holding unit comprises a ROM which is capable of electrically rewriting data.

9. An apparatus according to claim 6, which further comprises an on-board write interface having a function of rewriting the content of the data in said ROM while said device is mounted to said board.

10. An apparatus according to claim 1, wherein, when the state written into said internal bus monitoring unit is sent to the external device, a security function is imparted by using a predetermined password to a signal supplied from the external device.

11. An apparatus for estimating a microcontroller comprising, in a first device:
   a first data holding unit for holding arbitrary data rewritably;
   a first processing unit for operating a microcontroller on the basis of a first control signal and processing said arbitrary data;
   a first interface unit for external communication, for receiving signals supplied from the external device, taking out said first control signal and sending it to said first processing unit; and
   a first internal bus monitoring unit for monitoring the state of a first internal bus for mutually connecting said first data holding unit, said first processing unit and said first interface unit for external communication; and
   comprising, inside a second device:
   a second data holding unit for holding rewritably arbitrary data;
   a second processing unit for operating said microcontroller on the basis of a second control signal and processing said arbitrary data;
   a second interface unit for external communication, for receiving signals supplied from said first interface unit for external communication, taking out said second control signal and sending it to said second processing unit; and a second internal bus monitoring unit for monitoring the state of a second internal bus for mutually connecting said second data holding unit, said second processing unit and said second interface unit for external communication;

wherein, when program estimation of said microcontroller is executed, said first device and said second device are connected through said first interface unit for external communication and through said second interface unit for external communication;

said first processing unit inside said first device transfers the signals supplied from the external to said second interface unit for external communication through said first interface unit for external communication;

said second processing unit in said second device writes the state of said second internal bus at the time when a program for program estimation contained in the signals transferred to said second interface unit for external communication is operated, into said second internal bus monitoring unit, and inputs the state written into said second internal bus monitoring unit, to said first internal bus monitoring unit, or to said first data holding unit in said first device through said second interface unit for external communication and through said first interface unit for external communication, or sends said state to the external device; and wherein, when system estimation of said microcontroller is executed, said first device is cut off from said second device, and said second processing unit in said second device writes the state of said second internal bus at the time when a program for system estimation contained in signals written into said second data holding unit is operated, into said second internal bus monitoring unit through said second interface unit for external communication, and reads out the state written into said second internal bus monitoring unit from said second interface unit for external communication.

12. An apparatus according to claim 11, wherein said first interface unit for external communication includes a first serial interface for processing signals of serial form and a first parallel interface for processing signals of parallel form;

said second interface unit for external communication includes a second serial interface for processing signals of the serial form and a second parallel interface for processing signals of the parallel form;

when program estimation of said microcontroller is executed, said first device is connected to said second device through said first serial interface and through said second serial interface; and the signals supplied from the external device are inputted to said first parallel interface and are further transferred to said second serial interface through said first serial interface.

13. An apparatus according to claim 11, which further includes, in said first device, a first peripheral circuit for processing the signals of the parallel form sent from said first parallel interface in said first serial/parallel interface circuit, and includes, in said second device, a second peripheral circuit for processing the signals of the parallel form sent from said second parallel interface in said second serial/parallel interface circuit.

14. An apparatus according to claim 12, wherein at least one of a first peripheral circuit and a second peripheral circuit comprises a peripheral circuit for asynchronous communication, for processing signals in an asynchronous system.

15. An apparatus according to claim 13, wherein at least one of said first and second peripheral circuits comprises an asynchronous/synchronous communication peripheral circuit capable of processing signals in an asynchronous system or in a synchronous system.

16. An apparatus according to claim 12, which is not equipped with at least one of a first peripheral circuit for processing the signals of the parallel form sent from said first parallel interface and a second peripheral circuit for processing the signals of the parallel form sent from said second parallel interface, and the signals supplied from the external device are all transferred through said first and second serial interfaces.

17. An apparatus according to claim 11, wherein said first data holding unit comprises a first ROM which is capable of electrically rewriting the data, and said second data holding unit comprises a second ROM which is capable of electrically rewriting the data.

18. An apparatus according to claim 17, which further includes, in said first device, a first on-board write interface having a function of rewriting the content of the data in said first ROM while said first device is mounted to a first board, and includes, in said second device, a second on-board write interface having a function of rewriting the content of the data in said second ROM while said second device is mounted to a second board.

19. An apparatus according to claim 11, wherein, when at least one of the state written into said first internal bus monitoring unit and the state written into said second internal bus monitoring unit, is sent to the external, a security function is imparted to the signal supplied from the external device by using a predetermined password.

20. A method of estimating a microcontroller comprising:
assembling a data holding unit for holding arbitrary data rewritably, a processing unit for operating a microcontroller and processing said arbitrary data, an interface unit for external communication, for receiving signals supplied from an external device and processing them and an internal bus monitoring unit for monitoring the state of an internal bus, into one device;

writing the state of said internal bus at the time when said microcontroller is operated, into said internal bus monitoring unit on the basis of a control signal taken out from the signal supplied from the external device; and inputting the state written into said internal bus monitoring unit to said data holding unit, or sending said data to the external device.

21. A method of estimating a microcontroller comprising:
assembling a first data holding unit for holding rewritably arbitrary data, a first processing unit for processing said arbitrary data by operating a microcontroller, a first interface unit for external communication, for receiving the state supplied from an external device and processing them and a first internal bus monitoring unit for monitoring the state of a first internal bus, into one device;

assembling a second data holding unit for holding rewritably arbitrary data, a second processing unit for processing said arbitrary data by operating said microcontroller, a second interface unit for external communication, for receiving the signals supplied from the external device and processing them, and a second internal bus monitoring unit for monitoring the state of a second internal bus, into a second device;

transferring, inside a first device, the signals supplied from the external device to said second interface unit for external communication through said first interface unit for external communication when program estimation of said microcontroller is executed;

writing, in said second device, the state of said second internal bus at the time when a program for program estimation contained in the signals transferred to said second interface unit for external communication, is operated, into said second internal bus monitoring unit;

inputting the state written into said second internal bus monitoring unit to said first internal bus monitoring unit or to said first data holding unit in said first device through said second interface unit for external communication and through said first interface unit for external communication, or sending said state to the external device;

when system estimation of said microcontroller is executed, cutting off said first device from said second device, writing, in said second device, the state of said second internal bus at the time when a program for system estimation, contained in the signals written into said second data holding unit, is operated, into said second internal bus monitoring unit through said second interface unit for external communication, and reading out the state written into said second internal bus monitoring unit from said second interface unit for external communication.

* * * * *

UNITED STATES PATENT AND TRADEMARK OFFICE
CERTIFICATE OF CORRECTION

PATENT NO.   : 6,598,176 B1  
DATED        : July 22, 2003  
INVENTOR(S)  : Osamu Tago It is certified that error appears in the above-identified patent and that said Letters Patent is hereby corrected as shown below:

<u>Title Page,</u>  
Item [57], ABSTRACT, Line 14, change "ant" to -- at --.

Signed and Sealed this

First Day of June, 2004

JON W. DUDAS  
*Acting Director of the United States Patent and Trademark Office*